(12) United States Patent
Willard et al.

(10) Patent No.: US 7,523,145 B2
(45) Date of Patent: Apr. 21, 2009

(54) SYSTEM FOR MANAGING DATA IN A DISTRIBUTED COMPUTING SYSTEM

(75) Inventors: Pierre Willard, Palo Alto, CA (US);
Alain Delpuch, Les Essarts le Roi (FR);
Steven J. Szymanski, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 542 days.

(21) Appl. No.: 10/829,558

(22) Filed: Apr. 22, 2004

(65) Prior Publication Data
US 2005/0240631 A1    Oct. 27, 2005

(51) Int. Cl.
*G06F 17/30* (2006.01)

(52) U.S. Cl. ............. 707/203; 707/104.1; 717/170; 725/151; 725/152; 725/139; 725/138; 725/100; 386/119

(58) Field of Classification Search ............. 707/104.1, 707/1; 725/34, 100, 136, 151, 152, 138, 725/139; 717/170; 386/119
See application file for complete search history.

(56) References Cited

U.S. PATENT DOCUMENTS

| | | |
|---|---|---|
| 5,440,632 A | 8/1995 | Bacon et al. |
| 5,539,920 A | 7/1996 | Menand et al. |
| 5,548,532 A | 8/1996 | Menand et al. |
| 5,619,250 A | 4/1997 | McClellan et al. |
| 5,625,693 A | 4/1997 | Rohatgi et al. |
| 5,694,596 A * | 12/1997 | Campbell .............. 707/10 |
| 5,729,743 A | 3/1998 | Squibb |
| 5,805,825 A | 9/1998 | Danneels et al. |
| 5,835,911 A * | 11/1998 | Nakagawa et al. ......... 707/203 |
| 5,878,222 A | 3/1999 | Harrison |

(Continued)

FOREIGN PATENT DOCUMENTS

EP    0399200    11/1990

(Continued)

OTHER PUBLICATIONS

Magazine Radio-Fernsehen Elektronik, Issue 9 and Issue 10, 1996; Cover sheet, pp. 28 to 31 (Issue 9) and pp. 38 to 40 (Issue 10). English translation attached.

(Continued)

*Primary Examiner*—Jean M Corrielus
(74) *Attorney, Agent, or Firm*—Meyertons Hood Kivlin Kowert & Goetzel, P.C.; Rory D. Rankin

(57) ABSTRACT

A method and mechanism for managing data in a distributed computing system. A television system is configured to convey audio/video/interactive data to receiving devices. Data conveyed to the receiving devices are structured as modules, with a main directory module indicating those modules which make up, or are used by, a particular application. Changes to data being conveyed to receiving devices are initially indicated by conveying delta directory modules to the receiving devices which identify updates to a corresponding main directory module. Changes indicated by a delta directory module are applied to the corresponding main directory module, which in turn may effect changes in the data used by the application. Delta directories may generally only include sufficient information to identify the changes and may be smaller than the corresponding main directory.

22 Claims, 13 Drawing Sheets

U.S. PATENT DOCUMENTS

| | | | |
|---|---|---|---|
| 5,893,119 A | | 4/1999 | Squibb |
| 5,937,405 A | * | 8/1999 | Campbell .................... 707/10 |
| 5,990,927 A | | 11/1999 | Hendricks et al. |
| 6,038,319 A | * | 3/2000 | Chari ......................... 380/33 |
| 6,148,081 A | * | 11/2000 | Szymanski et al. ............ 380/33 |
| 6,157,411 A | | 12/2000 | Williams et al. |
| 6,177,930 B1 | | 1/2001 | Chernock et al. |
| 6,317,885 B1 | | 11/2001 | Fries |
| 6,374,268 B1 | | 4/2002 | Testardi |
| 6,377,951 B1 | * | 4/2002 | Campbell .................... 707/10 |
| 6,381,748 B1 | | 4/2002 | Lin et al. |
| 6,427,238 B1 | * | 7/2002 | Goodman et al. ........... 725/136 |
| 6,442,598 B1 | | 8/2002 | Wright et al. |
| 6,446,204 B1 | | 9/2002 | Pang et al. |
| 6,487,723 B1 | | 11/2002 | MacInnis |
| 6,604,236 B1 | | 8/2003 | Draper et al. |
| 6,895,595 B2 | * | 5/2005 | Goodman et al. ........... 725/136 |
| 7,055,169 B2 | * | 5/2006 | Delpuch et al. ............. 725/100 |
| 7,069,572 B2 | * | 6/2006 | Stalker ........................ 725/34 |
| 2002/0059645 A1 | * | 5/2002 | Soepenberg et al. ........ 725/137 |

FOREIGN PATENT DOCUMENTS

| | | |
|---|---|---|
| EP | 0752786 | 1/1997 |
| WO | WO 97/30549 | 8/1997 |
| WO | WO 97/41690 | 11/1997 |

OTHER PUBLICATIONS

Praxis; "Europa-Premiere: Empfanger fur das digitale Fernsehen"; Funkschau 1995, Issue 11, pp. 62-65. English Translation attached.

Hirtz Und Zwing: "OpenTV:Betriebssystem Fuer Interaktives Fernsehen", Fernseh-Und Kino-Technik, Mar. 1996, vol. 50, No. 3, pp. 84-89. English translation attached.

International Search Report; Application No. PCT/US05/13924; Oct. 3, 2007.

* cited by examiner

| | | | |
|---|---|---|---|
| 510 | Directory 501 | Application ID | Version 502 |
| | Application Type | | Memory Requirements |
| | Module Count | | Security Information |
| 520A | Transmission ID | | Module ID |
| | Module Version Number | | Length |
| | Memory Requirements | | Module Name |
| | Flags | | Security Information |
| 520B | Transmission ID | | Module ID |
| | Module Version Number | | Length |
| | Memory Requirements | | Module Name |
| | Flags | | Security Information |
| 520Z | Transmission ID | | Module ID |
| | Module Version Number | | Length |
| | Memory Requirements | | Module Name |
| | Flags | | Security Information |
| 530 | Certificate | | |
| | Signature | | |

SYSTEM FOR MANAGING DATA IN A DISTRIBUTED COMPUTING SYSTEM

BACKGROUND OF THE INVENTION

1. Field of the Invention

The invention relates to distributed computing systems and, more particularly, to management of data which is delivered to and/or retrieved by an interactive television receiver.

2. Description of the Related Art

Interactive television systems provide a means to deliver interactive content as well as ordinary television audio and video to a large number of subscribers. Programs broadcast by these systems may incorporate television audio and video, still images, text, interactive graphics and applications, and many other components. They may also provide a number of services, such as commerce via the television, electronic program guides (EPGs), video-on-demand, and other interactive applications to viewers. The interactive content of the interactive television signal may therefore include application code, data associated with the audio and video, control signals, raw data and many other types of information. This information may be combined into one or more signals for transmission to subscriber receivers.

The interactive functionality of the television is generally controlled by an integrated receiver/decoder (IRD), or similar mechanism, which is frequently incorporated into a set-top box. The IRD receives the signal provided by a broadcast service provider or system operator and separates the interactive portion from the audio-video portion. The IRD uses the interactive information to, for example, execute an application while the audio-video information is transmitted to the television. The IRD may also combine interactive graphics or audio generated by the interactive application with the received audio-video information.

Interactive content such as application code or information relating to television programs may be broadcast in a cyclical or repeating format. The pieces of information which are broadcast in this manner form what may be referred to as a "carousel." A carousel may include multiple modules of data, including a directory module which identifies the particular modules which correspond to a given application. While a single carousel may be transported as a contiguous data stream, it is also possible to multiplex two or more carousels into a single data stream. As an alternative or adjunct to using a carousel format, some systems may utilize a return path to request and/or receive interactive content.

The pieces of information, or data objects, in a carousel may be intended to be combined in a single object data stream in order to form a program. This program may also contain, or be associated with, streaming data such as audio or video. For example, an interactive television game show may combine television audio and video with interactive content such as application code which allows users to answer questions. Another example would be a news program which combines audio and video with application code that inserts current stock prices in a banner at the bottom of the screen. Still further, an interactive application may provide services such as shopping or Web browsing.

As noted above, interactive television applications may consist of a set of program modules including a directory module which identifies the modules which are part of the application. Security for the executable application may include attaching a signed certificate to directory modules and signing the directory content. In addition, the integrity of modules may be monitored by including respective hash values in the directory module. At a receiver the certificate and hash values may then be checked using various verification procedures. Applications which have been verified may then be executed.

Because applications may include data which is dynamic in nature, managing such data presents a variety of challenges. In order to effectively manage changes to data modules, a number of approaches may be used. One approach includes tagging modules with version numbers. By monitoring the version numbers of modules, a receiver may detect a new version of a module has been received. However, given there may be many modules which must be monitored, such an approach is not particularly efficient. Further, if a particular module is no longer being broadcast (i.e., the change in this case is the removal of the module from the carousel), simply monitoring version numbers of received modules may not be an effective means of detecting such a change.

Another approach to managing changes to modules involves monitoring directories. For example, as noted above a directory module may identify the modules which make up a particular carousel. Such a directory may also indicate the current version of each of those modules. If a module changes, a new directory may be broadcast and processed by the receiver. Examination of the directory may then reveal changes to modules in the corresponding carousel. However, directory modules themselves may be relatively large and the processing, verification, and analyzing of such modules may not be trivial. In addition, in order to ensure receivers are notified of changes without undue latency, these directory modules must be broadcast with a relatively frequently. Consequently, such an approach may consume an inordinate amount of bandwidth.

In view of the above, an efficient method and mechanism for managing data is desired.

SUMMARY OF THE INVENTION

A method and mechanism for efficiently managing data in a distributed computing system are contemplated. In one embodiment, a television system is configured to convey audio/video/interactive data to receiving devices. Data which is conveyed may be transmitted as carousels of modules. A main directory module is conveyed which identifies modules for use by a corresponding application. The directory module may be resident throughout execution of the corresponding application and may service requests for data by the application modules during execution. In one embodiment, the identification of updates or revisions to module data may be initially conveyed to receiving devices using delta directories which only indicate those portions of the data which are subject to revision. Such delta directories include an indication identifying a corresponding main directory. Upon receiving the delta directory, the corresponding main directory is updated to reflect the updates/changes indicated by the delta directory. Responsive to the changes to the main directory, new modules may be acquired, modules may be deleted, or existing modules may be revised.

In one embodiment, control over the main directories and delta directories is maintained by a broadcaster or system operator in cooperation with the underlying system of a receiving device. In such an embodiment, handling of directories in a receiving device may be controlled by the device operating system. In a further embodiment, an application may itself be configured to provide directory type services. Applications which are configured to manage data apart from the underlying system may utilize a source other than the broadcaster for updates to data. In this manner, the broadcaster or system operator may not have complete control over the directories and their content. Other objects and advantages of the invention will become apparent upon reading the following detailed description and upon reference to the accompanying drawings.

BRIEF DESCRIPTION OF THE DRAWINGS

FIG. 7 shows one embodiment of a directory module.

Figure 1:
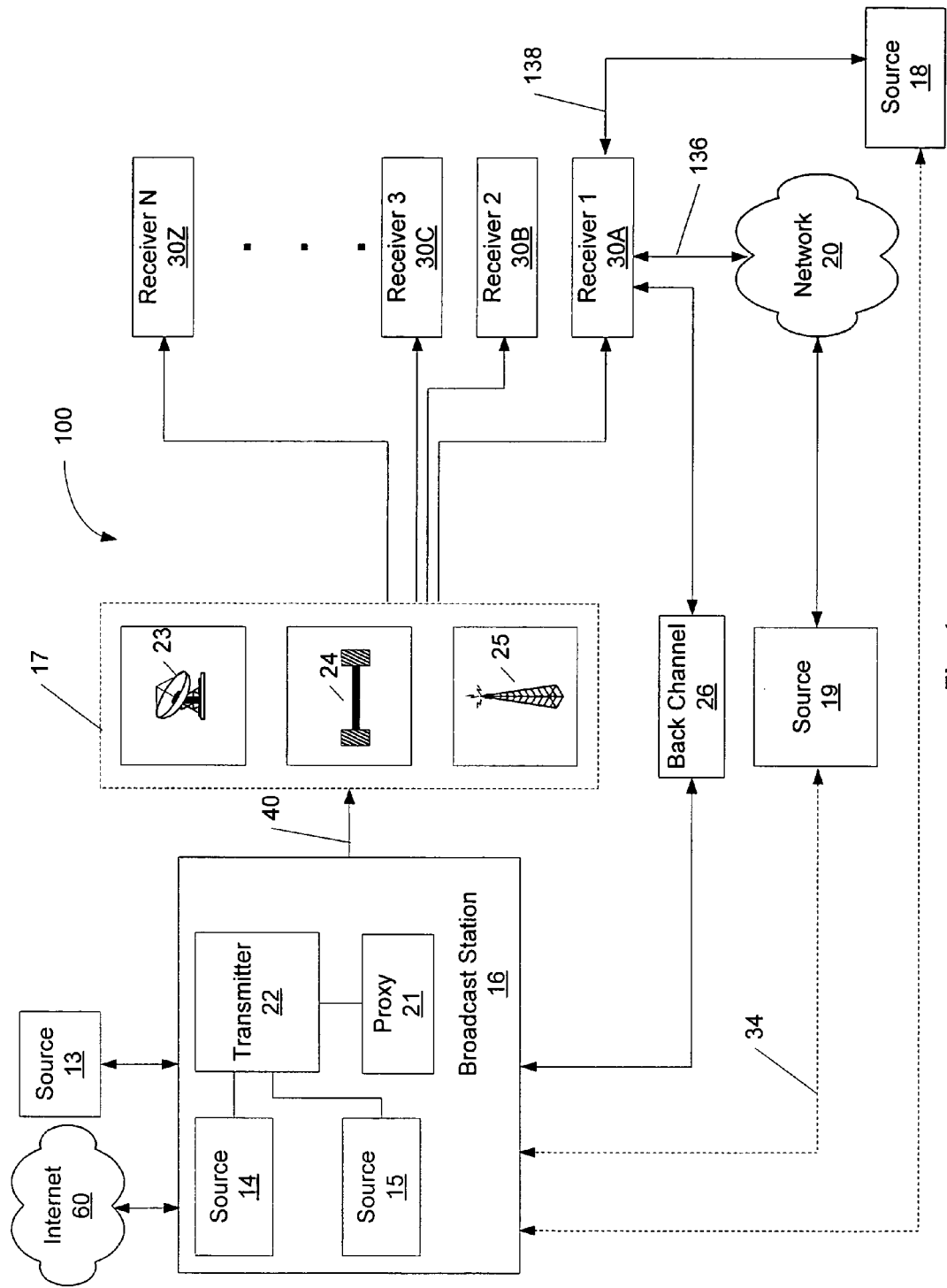
FIG. 1 is a block diagram illustrating one embodiment of an interactive television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, one embodiment of a television system 100 is shown. In the embodiment shown, receiving devices 30A-30Z are coupled to several sources of programming and/or interactive content. Each of receiving devices 30 may comprise a set-top box (STB), a television (TV), a video cassette recorder (VCR), a digital video recorder (DVR), a personal digital assistant (PDA), a personal computer (PC), a video game console, a mobile/cell phone, or any other suitable device. Elements referred to herein with a particular reference number followed by a letter may be collectively referred to by the reference number alone. For example, receivers 30A-30Z may be collectively referred to as receivers 30.

Included in the embodiment of FIG. 1 is a broadcast station 16 coupled to receiver(s) 30 via a transmission medium 17 and back channel 26. In addition, receivers 30 are coupled to both a source 18 and a source 19 via network 20 which may itself represent, or be coupled to, the Internet. Further, broadcast station 16 is coupled to a remote source 13, and Internet 60. In the embodiment shown, broadcast station 16 includes sources 14 and 15 and transmitter 22. Transmission medium 17 may comprise a satellite based system 23, a cable based system 24, a terrestrial or multiple multi-point distribution service (MMDS) based system 25, a combination of these systems, or some other suitable system of transmission.

In the embodiment of FIG. 1, broadcast station 16 may include a variety of sources of content 14, 15, and 60 to be utilized and conveyed by transmitter 22. Content sources 14 and 15 may include databases, application servers, other audio/video sources, or other data sources. In one embodiment, content may be created at a source 14 which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created at a remote location 13 may first be transferred to a storage medium, such as a CD-RW, DVD, or flash memory device, and transported to broadcast station 16 via more conventional means where it may be stored in a database or other storage device.

Subsequent to its creation, content from sources 13, 14, 15 and 60 may be delivered to receivers 30 through a transmission network. This network consists essentially of broadcast station 16 which assembles the content from sources 13, 14, 15 and 60 and processes the content as appropriate (e.g., digitizes, compresses, packetizes), and a transmission network 17 which receives the content 40 from broadcast station 16 and conveys it to one or more of receiving devices 30. In one embodiment, broadcast station 16 includes software and/or hardware which is configured to process the content conveyed by sources 13, 14, 15 and 60 as described above. A second delivery mechanism may include a direct point-to-point connection 138 between receivers 30 and source 18. Source 18 may, for example, comprise some type of server. Connection 138 may be an ordinary telephone line, cable, wireless, or otherwise. A third delivery mechanism may also be a point-to-point connection 136, but transmission of the content from a source 19 to receivers 30 is made via one or more shared networks (e.g., over the Internet).

FIG. 1 also illustrates broadcast station 16 may be optionally coupled to source 18 and/or source 19. Such a coupling may enable broadcast station 16 to work cooperatively with source 18 or source 19 in conveying content to receivers 30. For example, receiving devices 30 may be configured to combine content which is received from both the broadcast station 16 and another source (18, 19). Such an example may include incorporating Web based content with television programs. Also illustrated in FIG. 1 is a back channel (or return path) 26 by which receivers 30 may communicate with broadcast station 16. Back channel 26 may comprise a telephone line, cable, wireless, or other connection.

One delivery mechanism, the direct point-to-point connection to a source of content, may comprise communication via an ordinary telephone line. This type of connection is typically initiated by the receivers 30 to convey information to, or retrieve information from, a data server. Another delivery mechanism, the point-to-point connection through one or more networks, may comprise a typical connection between nodes on the Internet. Because data routed through the Internet may involve a number of different shared networks, the data may be read, stored and written many times as it is transmitted from source 19 to receiver 30. As already noted, a third delivery mechanism may include a satellite, cable or terrestrial broadcast network 17. Information may be transmitted to and from receivers 30 both in a real time manner, or in a store and forward manner.

In one embodiment, broadcast station 16 further includes a proxy server 21 which is configured to transcode received content to a format compatible with one or more of client devices 30. For example, proxy 21 may receive Web based content including content written in SGML, XML, HTML, JavaScript™ (JavaScript is a trademark of Sun Microsystems, Inc), CSS, or other languages, and transcode the received content to a format compatible with clients 30. In alternative embodiment, clients may be configured to directly process such content. In such a case, proxy 21 may be configured to perform certain types of preprocessing of the content prior to conveyance to the clients.

In one embodiment, information conveyed from broadcast station 16 to receivers 30 is compressed in order to conserve bandwidth. Any of a number of compression algorithms, such as one of the Motion Picture Expert Group (MPEG) compression standards, may be used as appropriate for a particular program or application. Time stamps may also be added to, for example, synchronize associated audio and video signals. Subsequent to compression, data may be packetized prior to transmission. Packetization generally entails forming the compressed (or uncompressed) information into packets. The packets are then multiplexed to form an audio-video-interactive signal for transmission over the broadcast channel.

Receivers 30 process the received packetized signal to reconstruct the television programs and interactive applications which are embodied in the signal. The reconstructed applications may then be executed in the receiver, while the reconstructed television programs are passed to a television for display. The interactive applications may generate graphics and/or audio which are combined with the television program prior to being displayed.

Figure 2:
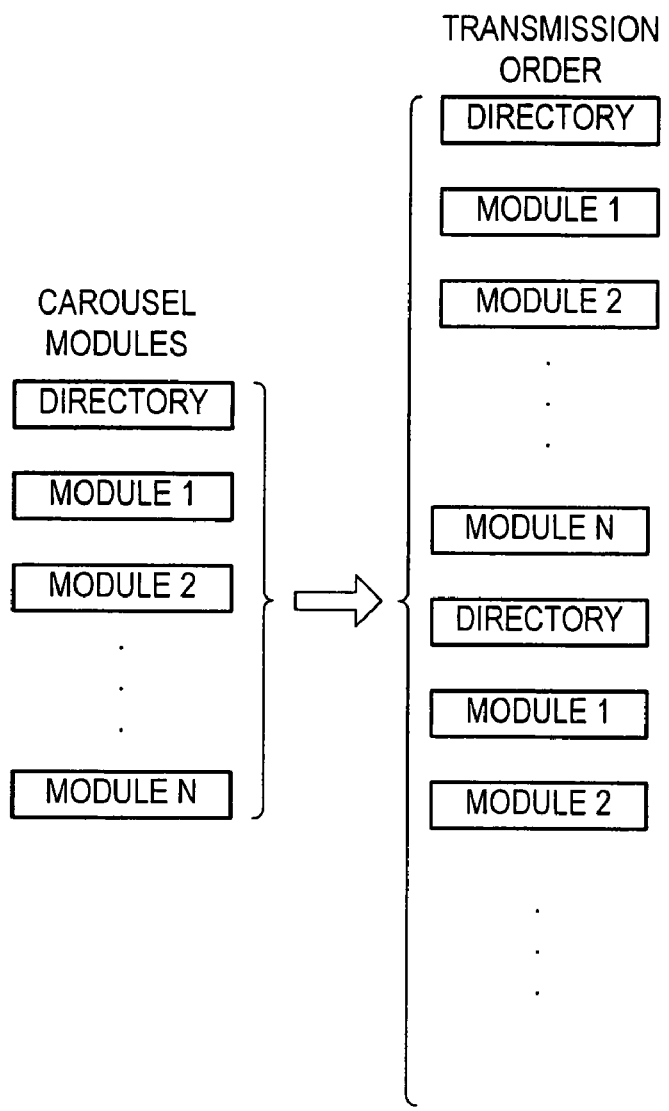
FIG. 2 depicts one embodiment of a carousel and modules.

FIG. 2 illustrates an embodiment wherein an application (and in fact, any carousel) may consist of a series of modules, one of which is a directory module. The directory module typically has a unique identifier so that it can be identified during transmission without further information. The directory module contains an entry for each of the modules in the application and in one embodiment any module which does not have a corresponding entry in the directory module is not recognized by the application. The directory module contains enough information to allow a receiver to access all parts (i.e., modules) of the application which may be necessary for operation of the program. The directory module is generally accessed before other modules of the application so that the remainder of the modules can be properly interpreted. In addition, the directory module may be transmitted several times during the cycle in which the modules of the application are transmitted in order to ensure that it is available for essentially random access to the other modules.

In one embodiment, a new type of module is utilized to effect, or otherwise indicate, changes to the data in a carousel. This new type of module, a "delta directory" module, generally corresponds to one of the above described directory modules ("main" directory) and may indicate changes to the corresponding main directory module. However, rather than identifying all modules of a carousel, a delta directory module (or "delta directory") may only include enough information to identify revisions or changes to a corresponding carousel. In this manner, the bandwidth consumed in an effort to manage data changes may be reduced and the processing overhead required of a receiving device may be reduced as well.

Figure 3:
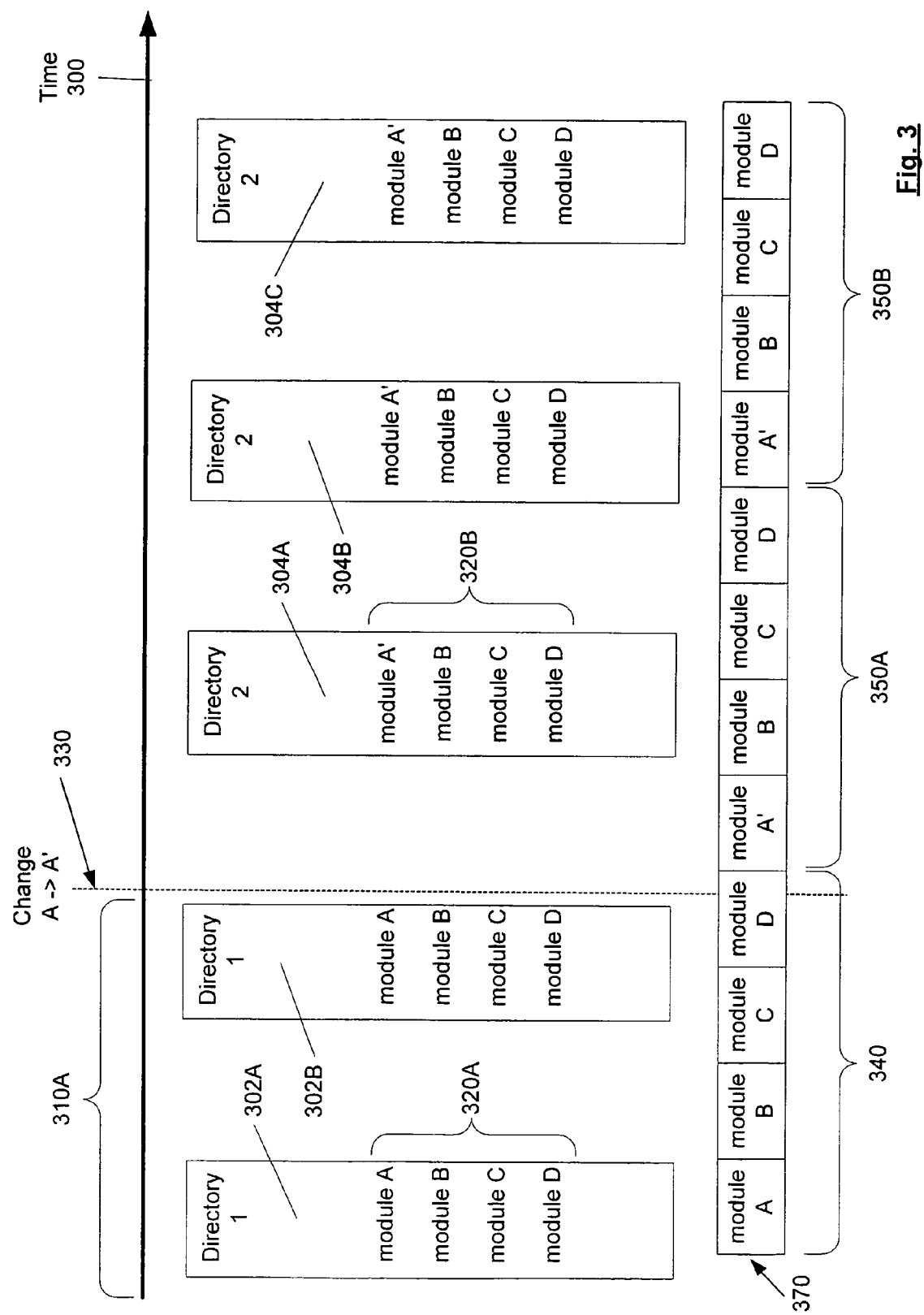
FIG. 3 illustrates one embodiment of a transmission stream.
Figure 4:
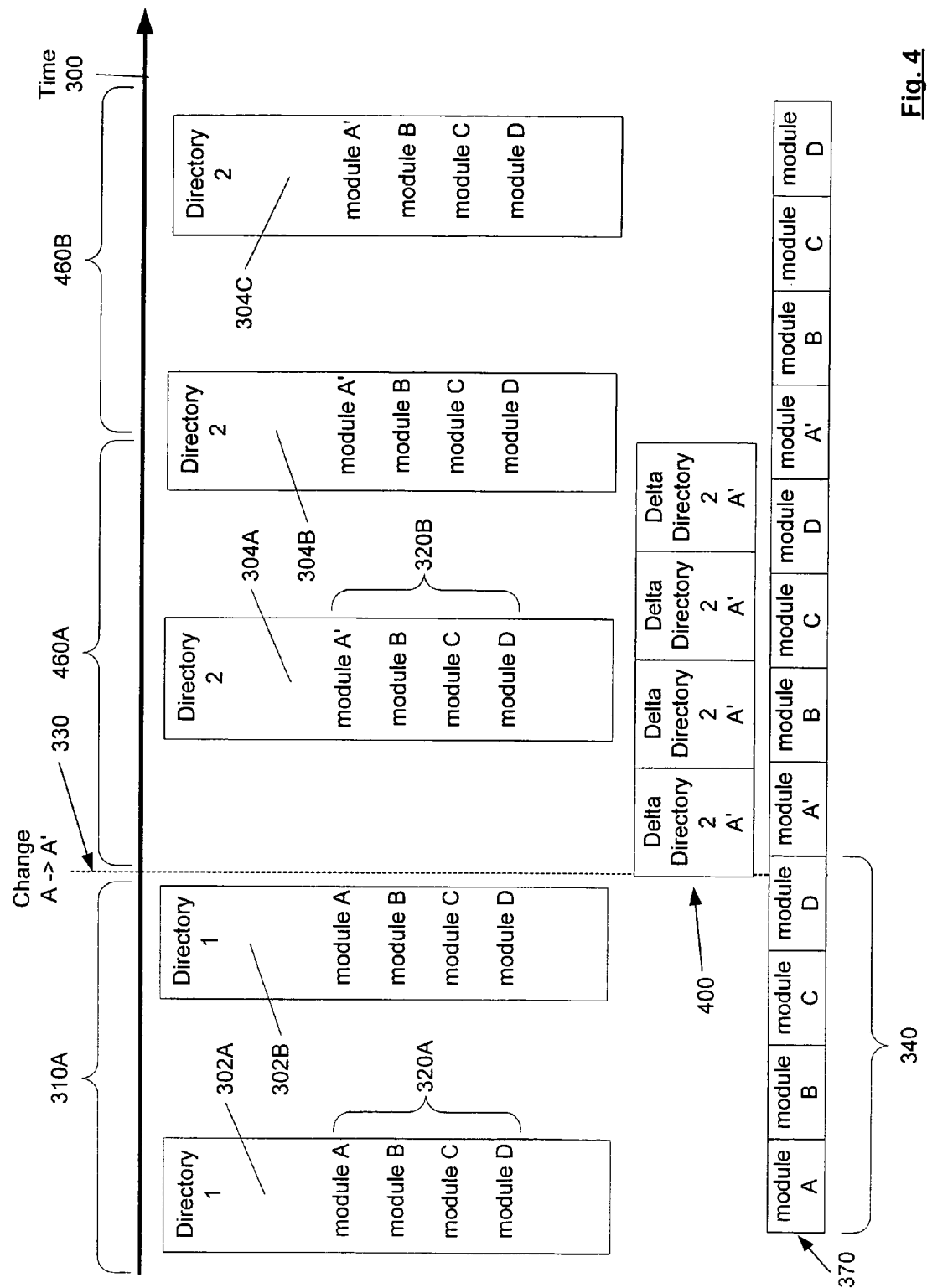
FIG. 4 illustrates one embodiment of a transmission stream.

Turning now to FIGS. 3 and 4, embodiments without the use of delta directories and with the use of delta directories are depicted. FIG. 3 illustrates an embodiment in which directories may be monitored for carousel changes, but delta directories are not used. Illustrated in FIG. 3 is a timeline 300 which generally shows the progression of time from left to right. Also illustrated is the transmission of directories (302A-302B, 304A-304C) and modules 370. Generally speaking, directories are transmitted (e.g., via broadcast in a television system) which identify the modules corresponding to a particular application or carousel. For example, Directory 1 (302A) is shown to include the identification (320A) of modules A, B, C, and D. Modules A, B, C and D (340) are also shown to be transmitted during a given time frame 310A. It is noted that while FIG. 3 depicts the directories at particular intervals and the other modules (370) in a particular order at a given frequency, the illustration of FIG. 3 is not intended to be representative of any particular order or frequency of transmission. For example, various modules or portions of data may be partitioned into smaller units and multiplexed with other data into a larger transmission stream. Those skilled in the art will appreciate the wide variety of ways in which the data shown may be conveyed. Elements referred to herein with a particular reference number followed by a letter may be collectively referred to by the reference number alone. For example, directories 302A-302B may be collectively referred to as directories 302.

Generally speaking, in order for a receiving device to properly utilize the carousel of data corresponding to a given directory, the receiver must first receive and process the directory and then receive and process the modules identified by that directory. In the example of FIG. 3, a first directory module, Directory 1 (302), is shown to be transmitted twice during a time frame 310A. Also shown during the time frame 310A is the transmission of the modules identified by the directories 302. While modules A-D are shown to be transmitted throughout the time frame 310A, a receiver generally must first process one of the directories 302 prior to processing and taking advantage of the modules A-D and the application, object, or entity that they represent. Therefore, if a receiver (or application) were to be activated subsequent to the transmission of the first directory 302A, but prior to the transmission of the second directory 302B, the receiver would have to wait for the second directory 302B before taking advantage of the entity (e.g., executable application, web page, etc.) represented by the corresponding modules 370.

Also depicted in FIG. 3 is a change 330 to the carousel data being transmitted. Updates and/or revisions typically entail transmitting an entirely new directory module which reflects the changes. As described above, processing of a new directory and its corresponding application modules consumes both time and resources. When only a minor change is made to the directory module or application, processing of a completely new directory and corresponding modules may be inefficient. In addition, transmitting an entirely new directory module when most of the directory remains unchanged may consume an inordinate amount of bandwidth. In the example shown, module A has been replaced by module A'. Subsequent to this change, the transmission of the modules 370 is changed to reflect the new module A' as shown in module groups 350A and 350B. In addition, a new directory (Directory 2) 304A is transmitted with a revised list 320B indicating the new module A'. In order to take advantage of the carousel with the revised data module A', a receiver must first receive and process one of the new directories 304. Consequently, there may be a relatively significant delay between the time the change 330 occurs, and the time a receiver may take advantage of the change. In order to improve the efficiency of the method and mechanism, the use of "delta" directories may be used.

Turning now to FIG. 4, an embodiment which utilizes delta directories is illustrated. The example if FIG. 4 is similar to that of FIG. 3 with like components similarly numbered. However, in the embodiment of FIG. 4, delta directories 400 are shown to be transmitted at or following the change 330 of module A->A'. In this example, four delta directories 400 are transmitted during a timeframe 460A. In other embodiments, the transmission of delta directories may begin sooner or later relative to a particular change. In addition, the number of delta directories transmitted, the frequency of their transmission, and the duration of their transmission may differ as well.

Generally speaking, each delta directory will include a minimum (or reduced) amount of information necessary to identify, or indicate, a revision to a corresponding main directory. In addition, each delta directory may also include an identifier which identifies the main directory to which it corresponds. Any manner suitable for identifying the relationship between a delta directory and a main directory may be utilized. For example, in one embodiment sequential identifiers (e.g., version numbers) may be included in each unique main directory which is transmitted and delta directories may include an identifier which identifies the main directory which it modifies. Alternatively, delta directories may include an identifier which indicates the version of a main directory after applying the delta directory. Numerous such alternatives are possible.

For example, in FIG. 4 each of the delta directories includes the identifier "2" which indicates the version of the main directory resulting after application of the delta directory. In one embodiment, main and/or delta directories are numbered in sequence. Consequently, a receiving device which receives one of these delta directories may determine that the delta directory follows, and modifies, a main directory identified as "1" (the immediately preceding sequential identifier). If the receiving device has already obtained a directory module "1" (e.g., 302A or 302B in FIG. 4), then the revisions indicated by the received delta directory 400 may be applied to the main directory. On the other hand, if a receiving device has not already received the corresponding main directory, then the receiving device must generally wait to receive the main directory which reflects the change in data. In FIG. 4, Directory 2 (304A-304C) represents a new main directory reflecting the change 330 in data.

In one embodiment, an update to a main directory may be represented by a single (version) delta directory. As depicted in FIG. 4, such a delta directory may be conveyed one or more times as desired. Subsequent to conveying the delta directory, a new (updated) main directory is conveyed. In such an embodiment, if a receiving device receives the delta directory and has the main directory which it updates, then the receiving device may simply apply the indicated update. Alternatively, if the receiving device does not have the corresponding main directory, then the update represented by the delta directory may not be applied. In any of the embodiments described herein, delta directories may indicate either the version which it produces, the main directory version which it updates, or both. In a system which uses only a single version of a delta directory to update a main directory, it may not be necessary for the delta directory to explicitly identify the main directory version which it updates. For example, if a sequential numbering or versioning scheme is utilized, then the main directory version which a delta directory updates may be assumed to be the number/version which immediately precedes the version produced by the delta directory. Numerous such alternatives are possible and are contemplated.

In an alternative embodiment, multiple delta directories versions corresponding to a particular main directory may be conveyed and received. Such multiple delta directories may provide incremental updates, cumulative updates, or some combination of both. In an embodiment which is configured to use multiple delta directory versions, each delta directory may identify both the version of the main directory it updates and the version which it produces. So, for example, if three delta directory versions have been conveyed which are configured to update a particular main directory, and the second delta directory was not received, then the third delta directory may only be applied to the main directory if it represents a cumulative update. Otherwise a receiving device may have to wait for transmission of a new main directory, retransmission of the second delta directory if the embodiment supports such a retransmission, or the transmission of a delta representing a cumulative update. In such an embodiment, delta directories may also include an indication as to whether or not they represent a cumulative update.

As can be seen from the example of FIG. 4, each delta directory module 400 includes information identifying the change 330 (A') which has occurred. In general, a single delta directory may indicate any number of changes. As the delta directory may only include information identifying this change, the delta directory may be significantly smaller than the main directory to which it corresponds. Consequently, the bandwidth consumed by transmitting such a delta directory will be significantly reduced as compared to the transmission of a main directory. In addition, because the delta directory is smaller, the overhead required to process the delta directory by a receiving device will also be reduced. In the example of FIG. 4, the transmission of delta directories begins soon after the indicated change 330 in data. Therefore, receiving devices which already have directory "1" (302) may receive and process the delta directory much sooner than if they had to wait for the main directory "2" (304). Because the delta directory is smaller than the main directory, and the delta directory is received sooner than the main directory, receiving devices may implement the indicated changes 330 much sooner than may be otherwise possible. In addition, the application of a delta directory to a main directory may also update the identifier (version number) of the updated main directory. Therefore, when the new main directory (304) is transmitted, the receiving device will detect that it already has current directory information and does not need to process the newly transmitted main directory. Accordingly, overall system performance and efficiency may be improved.

Figure 5:
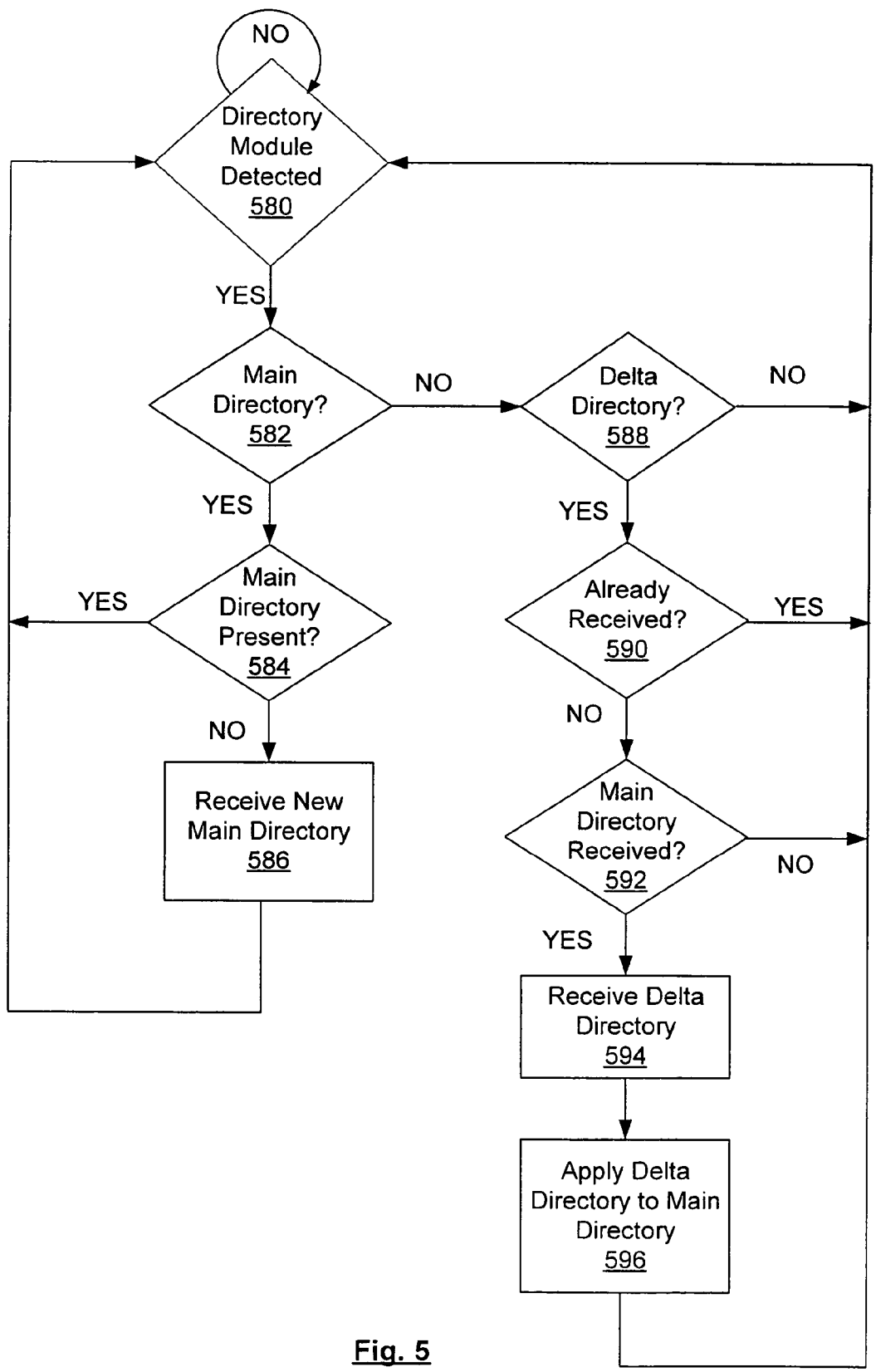
FIG. 5 illustrates one embodiment of a method for managing data.

A high level overview of one embodiment of a method which utilizes delta directories in the management of data is illustrated in FIG. 5. Generally speaking, the flow represented in FIG. 5 depicts actions which may take place in a receiving device and for purposes of discussion such will be assumed. However, the method described herein may be utilized anywhere deemed appropriate within a given system. Decision block 580 indicates that received data is generally monitored by a receiving device. For example, in one embodiment data packets have header packets which may be analyzed by the receiving device in order to ascertain the nature of the received data. In an embodiment which includes directories as described above, the receiving device may determine whether received data corresponds to a directory module (decision block 580). If a directory module is detected (e.g., as indicated by a data packet header), the receiving device may make a further determination as to whether the directory is a main directory (decision block 582) or a delta directory (decision block 588). If neither a main nor delta directory is indicated, various embodiments may simply discard the data as erroneous, log an error message, or otherwise.

If the received directory data indicates the data corresponds to a main directory (decision block 582), the method determines whether the corresponding main directory is already present in the receiving device (e.g., stored in memory, or alternatively stored in non-volatile storage). Where the indicated main directory is already present in the receiving device, it may have been built from the combination of a prior main directory and delta directory, or a fully updated version of the main directory may have been received. As described above, in one embodiment, identifiers or version numbers may be used to distinguish one main directory from another. If the main directory is present (decision block 584), the data may simply be discarded and monitoring of received data may continue (decision block 580). On the other hand, if the received data corresponds to a main directory which is not present (decision block 584), then the main directory may be received and processed as appropriate. It is noted that different embodiments may receive either a complete directory, or less than a complete directory, prior to making a determination as to whether the directory is to be retained and processed. For example, in one embodiment, packet headers may include identifying information which identifies both the type and version of data being conveyed. In such an embodiment, a receiving device may simply examine the first few bytes of a received packet in order to determine whether the packet should be retained. In this manner, processing of received packets may be made more efficient.

If the received directory data indicates the data corresponds to delta directory (decision block 588) which has not already been received (decision block 590), a determination is made as to whether the main directory to which the delta directory corresponds has been received (decision block 592). In one embodiment, the delta directory may directly identify the main directory which it modifies. However, as already discussed, any suitable manner of associating delta directories with main directories may be used. If the corresponding main directory has not been received (decision block 592), the delta directory data may be discarded and processing returns to decision block 580. On the other hand, if the corresponding main directory has been received (decision block 592), then the delta directory is received, or retained for further processing if already fully received (block 594), and the changes indicated by the delta directory may then be applied to the corresponding main directory (block 596). Changes indicated by the delta directory, and applied to the main directory, may include the availability of updated versions of modules, the addition of new modules, the removal of certain modules, or any other changes deemed appropriate. In addition, a version number or other identifier of the main directory may be updated to reflect the fact that it represents an updated version. It is noted that the example of FIG. 5 is only intended to illustrate an overview of the handling of directories. While not shown, receipt and processing of other data is also managed.

Turning now to the remainder of the discussion, additional details, examples, and embodiments are illustrated. In one embodiment, directory modules may all have a common format consisting of three parts: a portion having fixed-length components; a portion having variable-length components; and a portion having certification information. The fixed-length portion contains data on the application and each of the modules in the application. The variable-length portion contains string data on the names of the modules and a hash of the modules. Finally, the certification portion contains the producer certificate and a directory signature. Those skilled in the art will appreciate there are numerous techniques available for verifying the authenticity or integrity of data. Common techniques include hashing, public key algorithms, MACs, padding, and so on. Examples of algorithms which have evolved over the years include MD-2, MD-4, MD-5, SHA-1, RIPEMD, HMAC-MD5, and HMAC-SHA. Accordingly, while the embodiments discussed herein may refer to a hash value, signature, or integrity data, any appropriate method of verification or authentication may be utilized with the embodiments described herein.

In one embodiment, an application includes at least one module which is downloaded and executed automatically. Other modules containing data or additional code may not be needed immediately, so they may be downloaded after execution of the application begins. The downloading of these modules may be subject to timing constraints, however, so the interactive television system is configured to take these constraints into account and deliver the modules in a timely manner. If necessary, one of these modules may be multiplexed with other modules or data to be sure it is received when needed.

Figure 6:
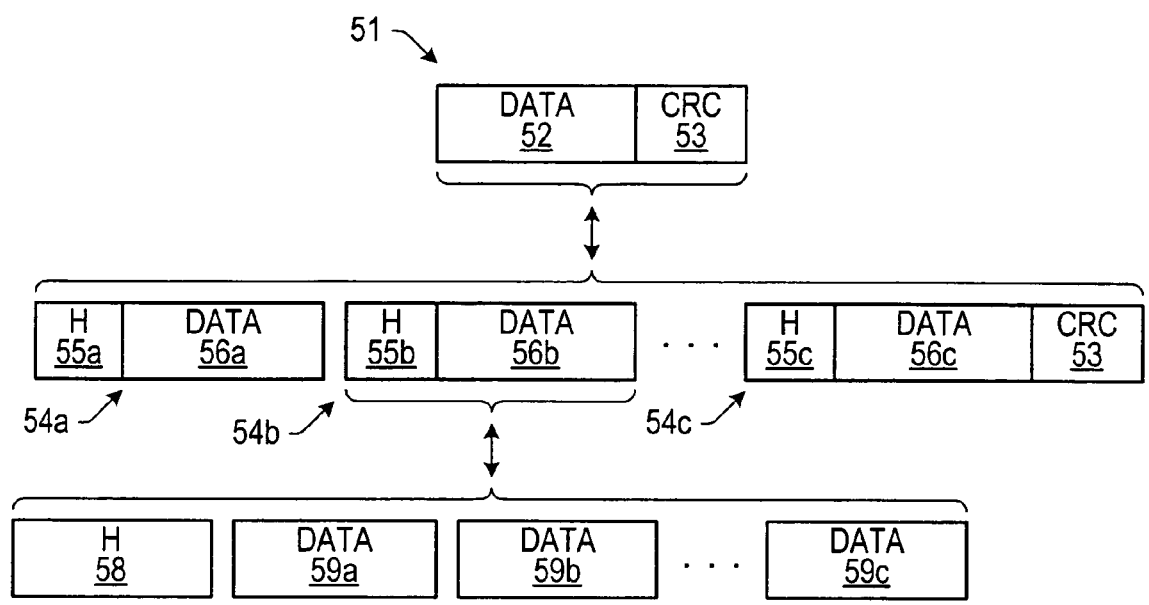
FIG. 6 illustrates one embodiment of transmission data.

Referring to FIG. 6, each of the modules 51 may include both a data segment 52 and a CRC segment 53. The data segment 52 of the directory module may be as described above. The data segment 52 of the remainder of the modules can contain any type of data, such as application code or raw data. The CRC segment 53 of each of the modules is used for error control and is computed for the entire data 52 of the module 51. Each of the modules 51 may further include a unique identifier. Before the modules 51 are transmitted, they are formatted into transmission units 54. Each of the transmission units 54 contains header information 55, which uniquely identifies that transmission unit 54 within the stream of transmission units, and data 56 which comprises a portion of the module being transmitted. The header 55 contains information such as the module ID, module offset, and size, which allow the transmission units 54 to be reconstructed into a complete module 51. The header 55 may further indicate what type of data 52 is included in the transmission unit 54. For example, in one embodiment the header 55 may include a special ID (e.g., a zero value ID) which identifies the module as a directory. Transmission units 54 comprising a particular module 51 may be interleaved with other transmission units 54 in a transmission stream. In the embodiment shown, the last transmission unit 54 for a module 51 carries the CRC 53.

The format of the transmission units 54 is generally dependent upon the transmission medium, but typically employs a series of packets. In one embodiment, the packets are of a fixed length (the last packet may be padded to obtain the proper length). The first packet 58 in the series carries the header information for the transmission unit 54. This header packet 58 is a special packet which can generate an interrupt in a receiving device's central processing unit (CPU) and which contains information to enable the CPU to determine whether the module 51 should be decoded and where it should be loaded into memory.

FIG. 7 illustrates one of many possible embodiments of a directory module 500. In the embodiment shown, the directory module 500 includes a header 510, application module data 520A-520Z, and certificate and signature data 530. The directory module header 510 includes an Application ID, a field indicating the Application Type (e.g., advertiser popup, interactive game, sports related, stock ticker, weather related, or any other suitable category), the amount of memory required to store and execute the application, the number of modules contained in the application, and a field which may include security data such as authenticating data. In one embodiment, the Application ID may include an indication 501 that a module is a directory module and may also include an indication 502 which indicates the version of the directory. As noted above, in one embodiment the header 510 may include a special ID separate from the Application ID which identifies the module as a directory. It will be appreciated that the fields listed above, and those that follow, are illustrative only. Different information may be included as appropriate. For example, directory module 500 may also include data which is accessed by an application during execution.

In addition to header 510, the directory module 500 includes data for each of the modules in the corresponding application. For example, data for each module may include a Transmission ID, Module ID, Module Name, version number, length of module, memory requirements, and so on. In one embodiment, the Transmission ID and/or Module ID may be utilized to identify the corresponding module's data within a broadcast stream. The data section for each module may also include a field for security data related to the respective module. Alternatively, this data may be included with the more general directory information in the first security information field. In addition to the above, various embodiments may allow execution of the application prior to receiving all of the modules identified by a corresponding directory module. In such embodiments, the directory module may also include an indication which identifies a subset of the modules ("preload modules") which are required before execution of a corresponding application may begin. For example, each module identified by the directory module may also include an indication as to whether or not the module is a preload module.

In one embodiment, the Module Name may comprise an ASCII string which may be used in application code to reference the corresponding module. Such an embodiment may be desirable in that it allows an application developer to use descriptive names within the application code. References using a Module Name may then be mapped to the corresponding object via a mapping table, or otherwise. For example, Module Names may be mapped to the Module IDs of corresponding objects within a broadcast stream, on a network, or otherwise. Such mapping is discussed further below.

It is further noted that various embodiments may include the use of a hierarchical directory scheme in which multiple directories may be used to identify the content corresponding to a given application. For example, a directory module may itself identify further directory modules ("sub-directory" modules), each of which describe a subset of the modules required by a particular application. Accordingly, module data 520 may identify program modules, directory modules, or any suitable combination of directory and program modules. In this manner a directory module may still identify application modules corresponding to an application, though some may be identified indirectly via sub-directory modules.

Figure 8:
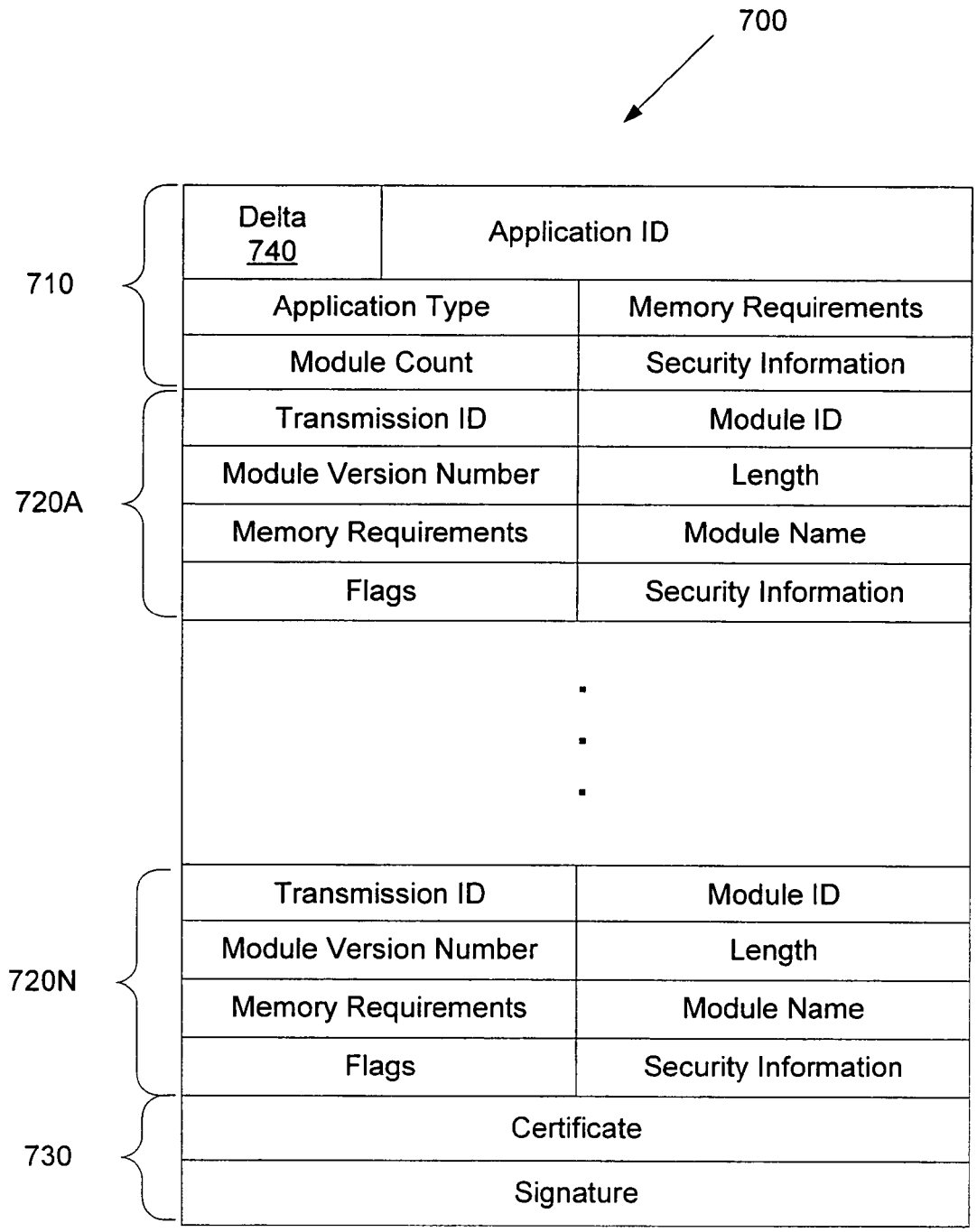
FIG. 8 shows one embodiment of a delta directory module.

FIG. 8 illustrates one embodiment of a delta directory. As already discussed, updates and revisions to directories may be indicated by "delta" directories. In one embodiment, a delta directory is a type of directory module whose content indicates changes to another directory module (e.g., a main directory module, sub-directory module, or other delta directory module). For example, a delta-directory may indicate an additional application module corresponding to a particular application is available. Alternatively, a delta-directory may indicate the removal of one or more modules from an application by indicating that the corresponding module transmission ID is no longer valid. Alternatively, delta directories may include a command code which indicates data is to be added, updated, or removed. A wide range of such changes, and manner of indicating such changes, are possible and are contemplated.

FIG. 8 illustrates a delta directory 700 which includes a header 710, module data 720A-720N, and module integrity data 730. Header 710 may include information similar to the directory header 510 shown in FIG. 7. In one embodiment, header 710 includes an application ID 750 which corresponds to, or otherwise identifies, a main directory. In addition, header 710 includes an indication 740 that the module is a delta directory module. The delta indication 740 may be a simple as a flag represented by a single bit, or any other suitable indication. Further, the delta indication 740 may also identify the main directory it updates, the version(s) to which it may be applied, the version which results upon application of the delta, and so on. In addition, rather than including module data for every module in a corresponding application, delta directory 700 may only include data corresponding to modules (or other data) which are to be changed in some manner. For example, in the embodiment shown, data for modules 720A-720N is shown to be included in the delta directory 700. This module data 720 may be used to update a corresponding main directory module. Based upon the updated main directory module, a corresponding action may then be taken (e.g., acquiring revised or new application modules, invalidating an existing application module, etc.). Because delta directory 700 may only include that data which is necessary to identify changes to an application and its modules (as opposed to an ordinary main directory module which may generally include data corresponding to all modules in an application), the resources required to process (e.g., acquire, authenticate, and otherwise verify) the directory module 700 and indicated modules 720 may be greatly reduced. As noted, the entries depicted in FIG. 8 are illustrative only. Other embodiments may have different entries to satisfy the needs of a particular system.

Figure 9:
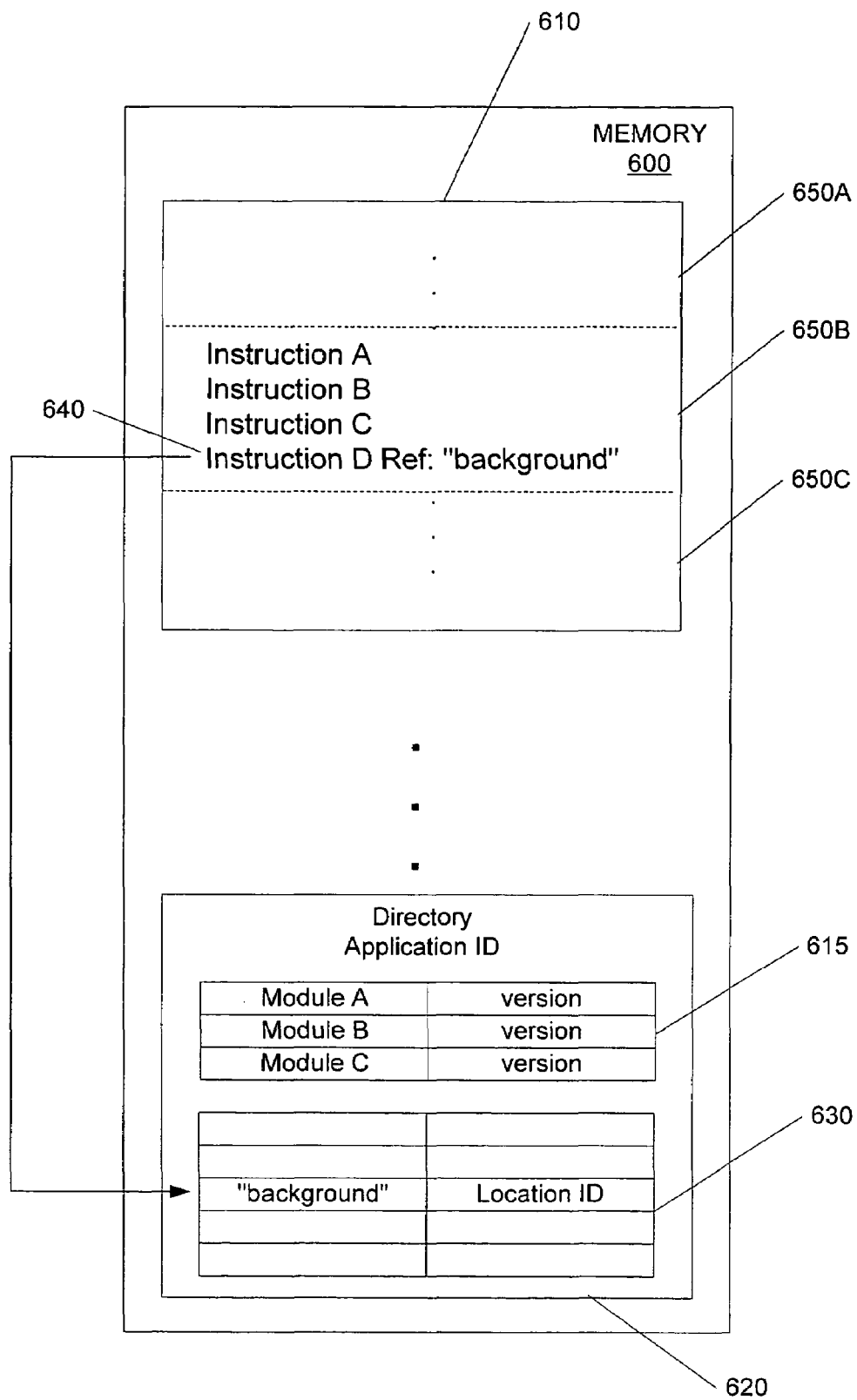
FIG. 9 depicts an application and directory stored in memory.

Turning to FIG. 9, one embodiment of an application stored in memory 600 is shown. In the embodiment of FIG. 9, both a portion of directory module data 620 and corresponding application code/data 610 are depicted. As described above, directory module 620 may include a list 615 of all modules required by the corresponding application. For example, application code/data 610 may include three modules 650A-650C which are identified by the corresponding directory module 620. It is noted that the depiction of FIG. 9 is not intended to be limiting or comprehensive in any way. Rather, FIG. 9 describes various features for purposes of discussion only. Those skilled in the art will appreciate that FIG. 9 is merely an abstract representation intended to aid in discussion and numerous alternative embodiments are both possible and are contemplated.

In the example of FIG. 9, the directory module 620 also provides a mapping function for an application. In one embodiment, a map 630 is configured to map identifiers referenced in the application code/data 610 to a particular location. For example, module 650B includes a number of program instructions. One instruction 640 includes a reference to an object identified as "background". In this example, "background" may refer to an object whose content is dynamic. Because the content is dynamic, acquisition of the "background" object may be required during runtime. Further, the location of the "background" object may not be known at the time the application is written. Consequently, rather than using a particular location identifier in the application code, an abstract identifier ("background") is referenced in the application code. This identifier may then be mapped to the actual location of the corresponding object at runtime. For example, "background" may be mapped to a particular packet ID, table ID, extension ID, etc.

In one embodiment, the content and processing of data (e.g., modules) may be controlled exclusively, or primarily, by a broadcaster. In this manner, the broadcaster may maintain control over the content received by the viewer. For example, an application received by a receiver may be configured to display advertisements. By maintaining control over content, the broadcaster may be able to select a particular advertisement for display based on a given viewer's profile. In addition, maintaining such control may allow the broadcaster to ensure a particular level of operational integrity. For example, the same broadcaster which delivers a particular application to a viewer may also ensure any resources required by that application are also made available. If an application requires a particular background image for display purposes, the broadcaster can ensure the required image is available in the broadcast stream, or via an alternative communications channel, when needed. By allowing the broadcaster to control the content of the directory 620 and/or its map 630, the broadcaster is able to not only control the content returned by the "background" reference, but also the location of that content. For example, the location of the content may be at a particular location within the broadcast stream, at a location indicated by a Uniform Resource Locator (URL), or otherwise.

In contrast to embodiments in which a broadcaster has exclusive, or primary control over management of data, alternative embodiments may include an application which is itself configured to manage directories, updates, revisions, and/or data mapping. For example, an application itself may be configured to obtain updates to its code and/or data. In one embodiment, an application may be configured to access a site or location which then indicates an application revision or update is available. In response, the application may pull the revision or update by initiating a request for conveyance of the revision or update. An application may then update code and/or data utilizing its own authentication/verification mechanisms. Alternatively, an application may be configured to utilize the underlying system's authentication/verification mechanisms. Further, an application may utilize its own listing of modules and version numbers and may be configured to utilize its own version of delta directories for updates and modifications. Any combination of the above may be utilized as appropriate. It is to be understood that while the above discussion describes both broadcaster management of data and application management of data, a system may incorporate any combination of the two.

As used herein, the underlying "system" generally refers to those portions of the hardware and/or software within a receiving device which are not directly accessible by ordinary applications without permission from the broadcaster or television system operator. For example, the underlying system may include a receiving device operating system and/or middleware, selected regions of memory or other storage, a conditional access subsystem, and so on. As an example, an application may have permission to read certain locations within system memory space via predetermined system calls, but may not write to such locations. Those skilled in the art will appreciate the various methods of protecting system resources from user level applications.

As already discussed, a directory may also provide mapping functions for one or more corresponding applications. As noted above, such mappings may be controlled by a broadcaster. Such control allows the broadcaster to manage both the content and location of data. However, in an alternative embodiment an application may control (or share) responsibility for managing mappings. In such an embodiment, an application may register mappings with the system and then use the same, or similar, system calls as in the embodiment described in FIG. 9. In such a case the map itself may remain a part of the directory, but its content may be controlled or affected by an application. Alternatively, all or part of a map may be included as part of the an application. Further, various embodiments may combine broadcaster provided mappings with application provided mappings. By allowing an application to register mappings with the system, the application may use a single set of system calls for both the broadcaster and application provided mappings. Still further, an application may be configured to register any type of data with a system and then use system calls to access that data.

Figure 10:
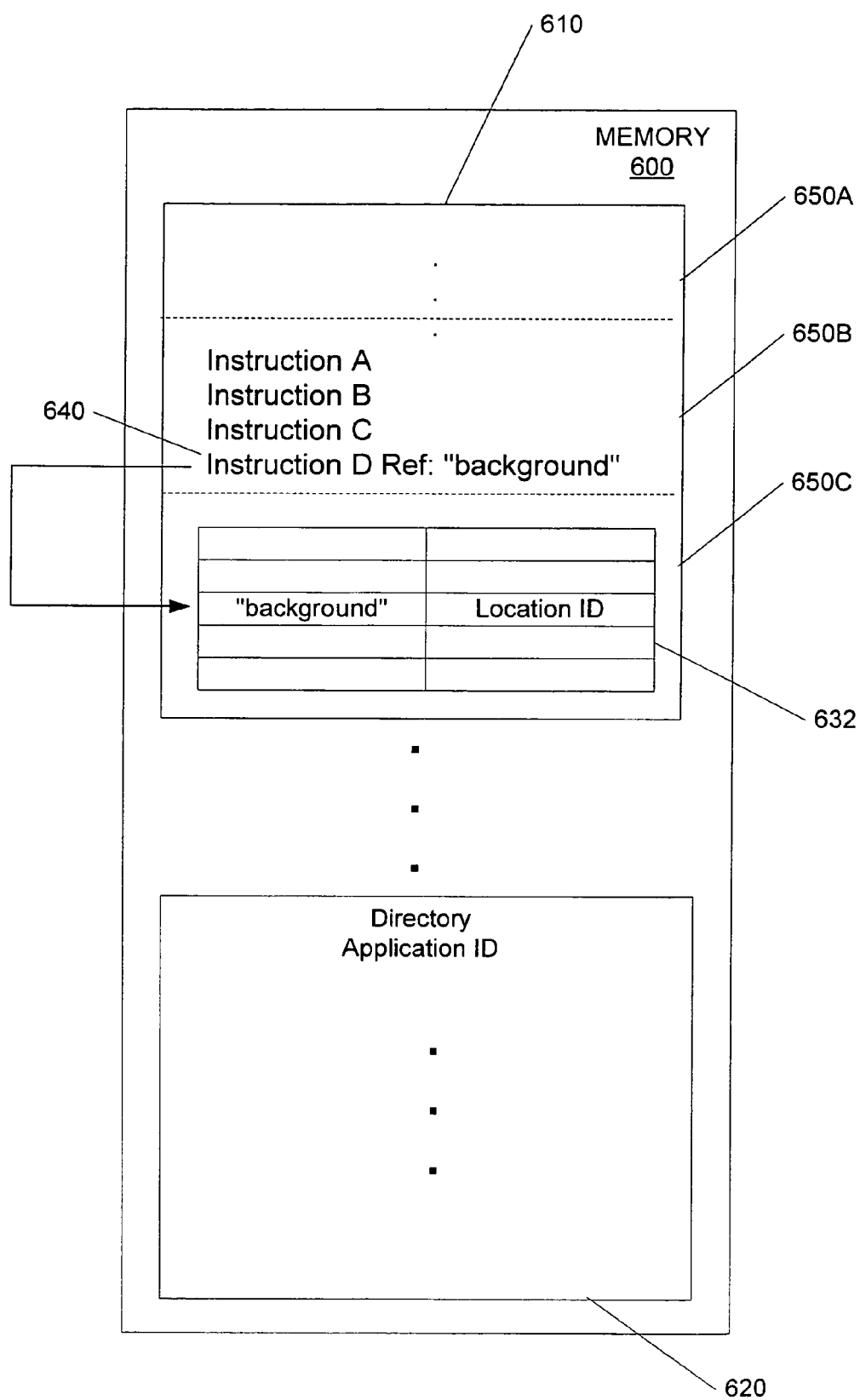
FIG. 10 depicts an application and directory stored in memory.

In an embodiment wherein an application is configured to manage directories or other data as described above, an application provider may determine where required data is located. In the embodiment described above, mapping data was provided by a broadcaster in order to determine the location of referenced objects. However, in an embodiment as illustrated by FIG. 10, an application itself may determine object locations directly. As with FIG. 9, FIG. 10 is an abstract representation intended for purposes of discussion. FIG. 10 illustrates an application in memory 600 similar to that of FIG. 9. As in FIG. 9, FIG. 10 shows application code/data 610, modules 650, and directory module 620. However, in the embodiment of FIG. 10 the application code/data 610 itself includes mapping data 632 which identifies the location of objects referenced. In the example shown, an instruction 640 references the object "background", which in turn may be mapped to a location via map 632. As the mapping data 632 may be provided by the application provider, both the location and the content of the data may be controlled by the application provider. Of course, in alternative embodiments, instructions may include direct references to object locations rather than using a mapping table.

It is noted that many receiving devices may include the ability for two-way communication. For example, a receiving device may include receivers for receiving broadcast signals, a broadband modem, and so on. Consequently, revision and/or updates to data may be either "pushed" or "pulled". Pushed data is conveyed to the receiving device irrespective of whether or not the device has requested, or needs, the data. Pulled data is conveyed to the receiving device in response to a request from the device. In an embodiment such as that described in FIG. 9 where an application has control over the location and/or content of data, it is more likely that data will be pulled to the device in response to requests made by the application. For example, an application provider may have a web site from which data is pulled. In contrast, because a broadcaster who maintains control over data content and location already knows the data which may be required by a receiving device, the broadcaster may push the data to the device. It is noted that an application may make a request for data which is then retrieved from either a pushed data source, a pulled data source, or both.

Figure 11:
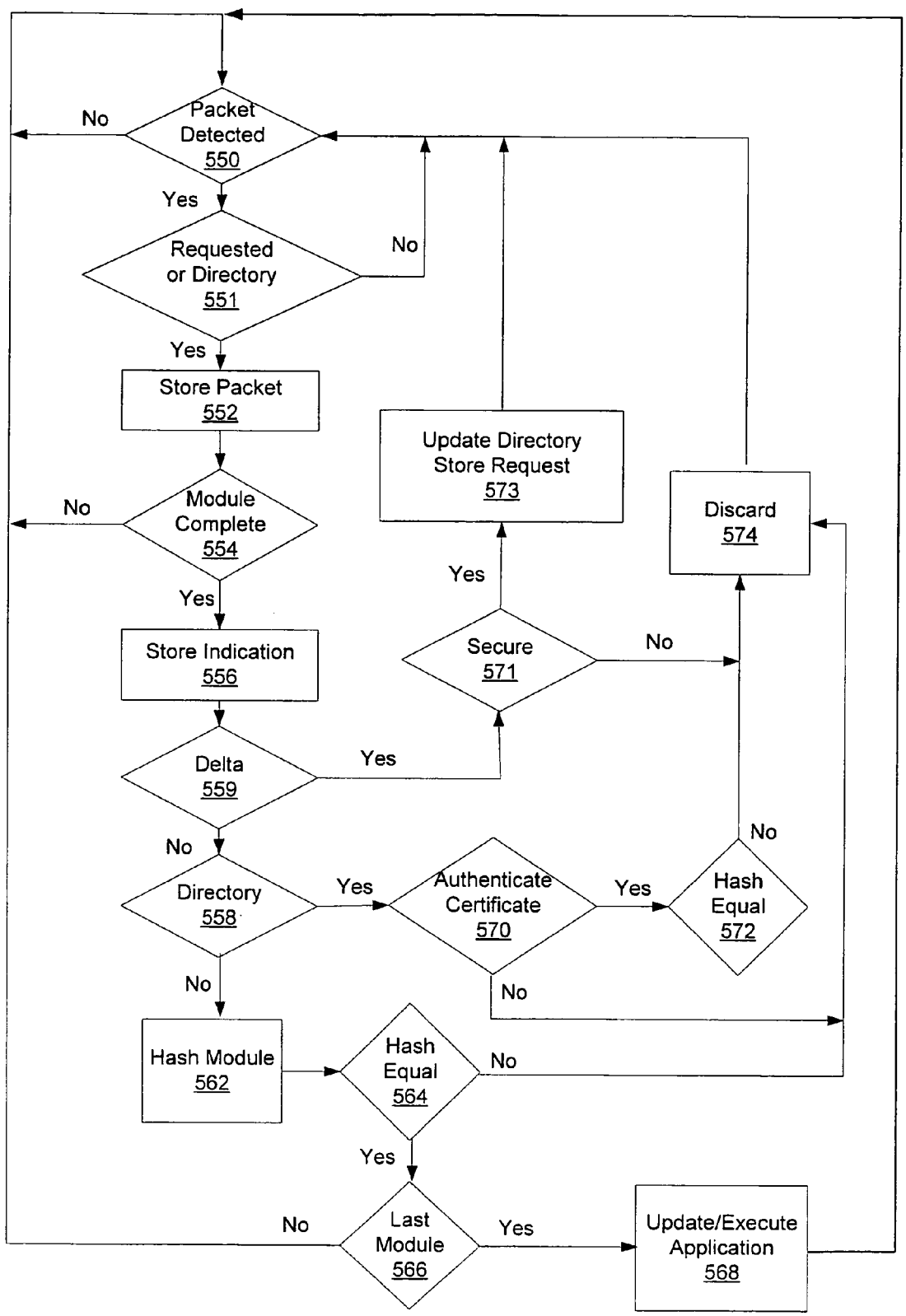
FIG. 11 illustrates one embodiment of a method for managing data.

Turning to FIG. 11, one embodiment of a method for receiving and processing data is shown. Those skilled in the art will appreciate there are numerous other ways of receiving and processing data and all such alternatives are contemplated. In the example shown, when a packet is detected (decision block 550), a determination (decision block 551) may be made as to whether or not the received packet corresponds to a pending request or a directory module. Pending requests, for example, may be stored in a pending request buffer and may correspond to modules identified in a directory module, or may be made by an executing application. If the packet does not correspond to a pending request, and does not correspond to a new directory module, the packet may be discarded or otherwise ignored. If the packet does correspond to a pending request (decision block 551) or a new directory module, its payload is stored in memory (block 552). If the module corresponding to the received packet is not complete (decision block 554), processing returns to decision block 550 to await further packets. If the module is complete (decision block 554), an indication may be stored (block 556) which indicates this particular module has been received and retrieval of packets corresponding to this module may be temporarily suspended.

Subsequent to storing an indication (block 556) that a complete module has been received, a determination (decision block 559) is made as to whether the received module is a delta directory module. If a delta directory module is received (decision block 559), security procedures may be performed on the module (decision block 571) to verify its authenticity and integrity. The procedures which are performed on the module may be based upon a desired level of security which is indicated by data (e.g., one or more flags) within the module itself. Alternatively the level of security applied may be based upon the type of module received, a default level for all modules, or otherwise. If the module is not deemed secure (decision block 571), the module may be discarded (block 574). Otherwise, any modifications indicated by the delta directory may be performed on a corresponding main directory module (block 573). In addition, a request for any new data or modules which are required may be added to a module request buffer. When the required module is received, it is matched to the request, security procedures may be performed, and any changes indicated by the module are applied to the corresponding application.

If the received module is not a delta directory module (decision block 559), a determination (decision block 558) is made whether the module is a main directory module. If the module is a main directory module, the system may attempt to authenticate (decision block 570) the application provider. In one embodiment, authentication may include decrypting a certificate which is appended to the directory module and checking its contents. If the content of the certificate is not authentic, the module may be discarded (block 574) and processing may return to decision block 550. In addition to discarding the module (block 574), the system may store, or update, an indication to indicate the module has not been received and retrieval of packets corresponding to the module may be resumed. Generally speaking, a module request will not be deemed to be satisfied until the corresponding module has been both received and verified/authenticated.

If the certificate is determined to be authentic (decision block 570), a further processing may be performed (decision block 572) to verify the signature that was appended to the directory module. If the signature is not verified, the module may be discarded (block 574), the system may store an indication that the module has not been received, and processing returns to decision block 550 to await further packets. If the signature is verified (decision block 572), the request corresponding to the module may be deemed to be satisfied.

In one embodiment, a request may be stored in a pending request buffer for each of the modules identified by the directory module. If the received module is not a directory module (decision block 558), then the module may represent application code and/or data identified by a corresponding directory module. In one embodiment, each of the application modules are processed to compute a corresponding hash value (block 562). If the computed hash value for a given module does not match (decision block 564) a corresponding hash value for that module which is retrieved from the corresponding directory module, appended to the module under test, or otherwise received, the module may be discarded (block 574). If the computed hash value for a given module matches (decision block 564) the corresponding hash value for that module, the request corresponding to that module may be deemed to be satisfied. Subsequently, a determination may be made as to whether all of the modules have been checked (decision block 566).

If all required modules have not been processed (decision block 566), processing returns to block 550. If all modules (or all modules required to initiate execution) have already been processed (decision block 566), the corresponding application may be executed (568). Alternatively, as described below, if the corresponding application is already executing, the application code and/or data may be updated in response to the received data. During execution of the application, the system may continue to receive program packets from the transmitted signal. In one embodiment, packet headers are examined for version numbers. If the version number for a particular module changes, the new module may be processed and substituted for the prior corresponding module.

As mentioned above, only a subset of application modules may be required before execution of the application is initiated. For example, a directory module may indicate which modules of an application are required prior to executing the application. In such an embodiment, execution of the application may be initiated upon receiving and verifying the required modules (decision block 566). Where all modules are required for execution, an explicit indication that all modules are required may be provided. Alternatively, if no indication regarding a particular subset of modules is provided, all modules may be assumed to be required for execution.

As noted that the sequence of events depicted in FIG. 11 is intended to be exemplary only. Various activities may be carried out in a different sequence, and some activities may performed or occur concurrently. For example, FIG. 11 illustrates hashing of each application module (block 562) as received. However, alternative embodiments may perform such hashing after all required modules are received. Verifying modules as received, rather than waiting until all have been received, may serve to reduce application startup latency. In addition, FIG. 11 illustrates an application module may be discarded (block 574) if it is not verified (block 564). In such a case, retrieval of the discarded module will generally resume. While the discarded module is again retrieved, verification (block 564) of other modules which have already been retrieved may continue in parallel with retrieval of the previously discarded module. Numerous such alternatives are possible and are contemplated.

It is further noted that received modules may correspond to an already executing application. For example, subsequent to receiving a subset of modules required for execution, an executing application may received additional modules identified by a corresponding directory module. Alternatively, an executing application may itself generate requests for modules. In any event, received modules may correspond to an already executing application and may be used for the purpose of updating existing application code or data. As used herein, "updating" application code or data may mean supplementing existing application code or data with additional data, removing existing code or data, or revising existing code or data.

Generally speaking, in the embodiments described herein, delta directories are described as including data which is used to update a corresponding directory module. For example, if a revised version of an application module is available, a delta directory may be used to update the directory module corresponding to that application with data which identifies the revised application module. Subsequent to updating the directory module, the revised application module may then be obtained. In such an embodiment, the delta directory does not itself include the revised application module or otherwise indicate what revisions are present in the revised application module. Rather, the delta directory only identifies changes to the application indirectly by identifying changes to the corresponding directory module. However, it is noted that in other embodiments a delta directory may itself be used to convey some or all of the content of changes. For example, if a revised application module has become available, a delta directory module may identify changes to a corresponding directory module and include the content of the revisions as well. Such revisions may then be directly applied to an existing application module rather than obtaining an entirely new application module. Still further, alternative embodiments may include delta directories which include revisions to application code and/or data, but do not update a corresponding directory module. Any combination of the methods and mechanisms described herein are possible and are contemplated.

In one embodiment, subsequent to processing a delta directory module, the delta directory module may be discarded after the indicated data has been updated. For example, referring to FIG. 9, if the location of the "background" object were changed by a broadcaster, a delta directory may be conveyed which merely updates the mapping data 630 included in the directory module 620. Where only changes to the directory module are made, the delta directory may simply identify the corresponding application or directory module, without identifying any application modules in particular. Subsequent to updating the corresponding directory module, the delta directory may be discarded.

As an alternative to discarding the delta directory module, other embodiments may retain delta directories and indicate updates to the directory module in other ways. For example, alternative embodiments may save received delta directory modules which are then referenced as appropriate for revised data. Embodiments may also include conveying and saving all such delta directory modules, conveying and saving a delta directory module which reflects cumulative changes, or otherwise. Numerous alternatives are possible and are contemplated.

In addition to the above, it is noted that various types of data conveyed by a broadcaster may require different levels of security. For example, because executable application code has the potential to cause unexpected or otherwise erroneous operation of a viewer's receiving device, a broadcaster may wish to carefully authenticate and verify such data. On the other hand, data which has less potential for adversely impacting the operation of a receiving device may require less stringent scrutiny. Accordingly, requiring the highest level of security for all data may be inefficient. In one embodiment, a delta directory may further include security information which indicates a required level of security. For example, if a modification of executable code is conveyed, then the delta directory may indicate that a relatively high level of security is required. Data which requires a high level of security may require full authentication and verification. Alternatively, a delta directory may indicate that the data which is being updated/revised does not require a high level of security. In such a case the receiving device may bypass one or more of the available security measures.

Figure 12:
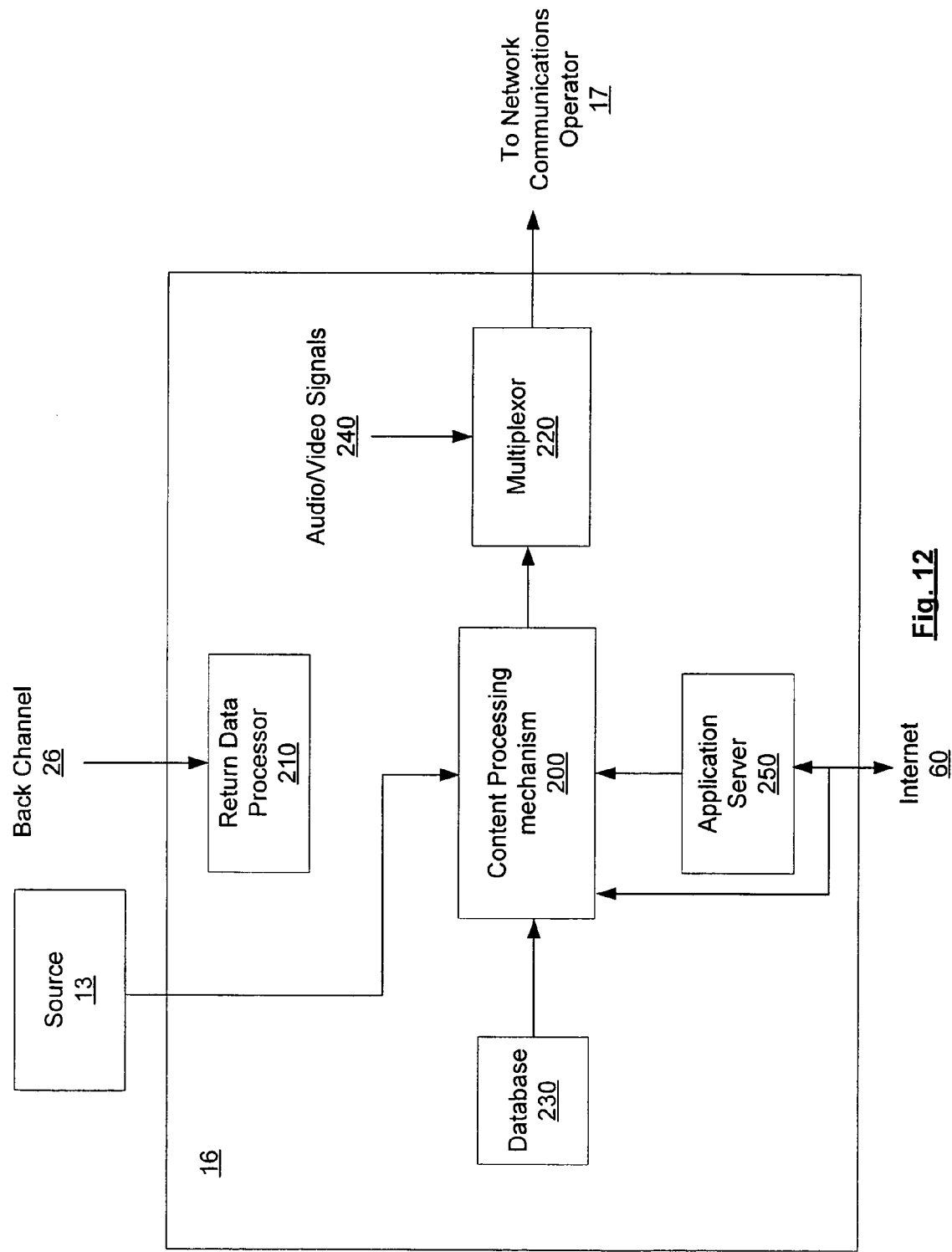
FIG. 12 is a block diagram illustrating one embodiment of a headend.
Figure 13:
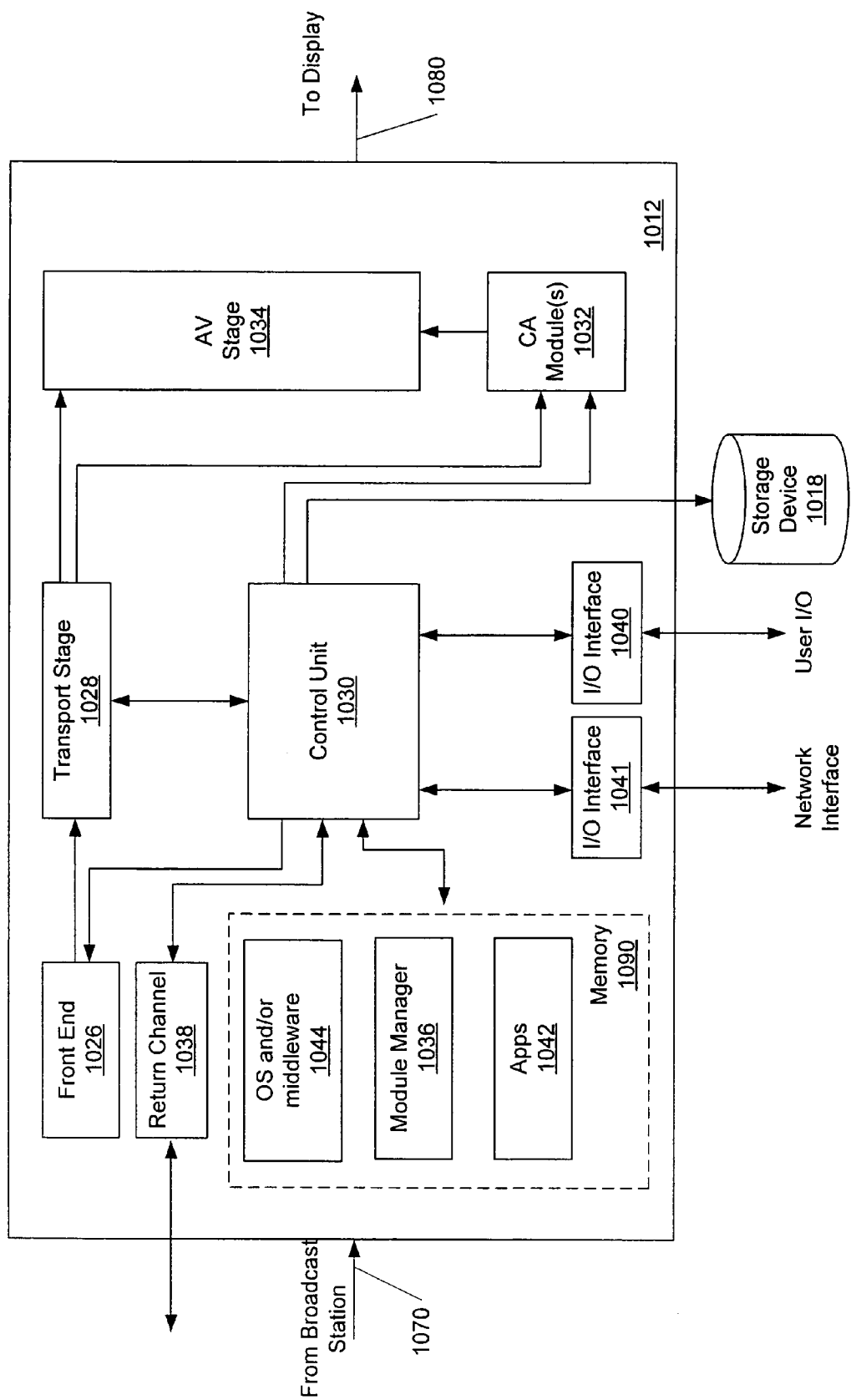
FIG. 13 is a block diagram illustrating one embodiment of a receiving device.

Finally, turning now to FIG. 12 and FIG. 13, one embodiment of a broadcast station and receiving device are shown. The broadcast station 16 of FIG. 12 includes an application server 250 and a database 230 which may contain previously created interactive content. Also shown in FIG. 12 is a source 13 of content (e.g., the Internet) which is external to broadcast station 16 and coupled to broadcast station 16. Database 230, server 250, Internet 60, and source 13 are coupled to a content processing mechanism 200 which is configured to process the content received and convey the processed content to a multiplexor 220.

In one embodiment, content processing mechanism 200 comprises a computer coupled to receive and convey content from source 13, database 230, or server 250. Processing mechanism 200 is configured to convey the processed content to multiplexor 220. Multiplexor 220 is also coupled to receive audio/video signals 240. Multiplexor 220 multiplexes the received signals and conveys the multiplexed signal to network communications operator 17 where it is subsequently conveyed to a receiving device. As noted above, mechanism 200 may be configured to process received content prior to conveying the content to client devices. For example, mechanism 200 may be configured to receive requests from clients for web based content, obtain the requested content, and transcode the received content to a different format prior to conveyance to the requesting device. Finally, in addition to the above, broadcast station 16 includes a return data processor 210 coupled to back channel 26. In one embodiment, return data processor 210 may comprise a modem which receives data for further processing within broadcast station 16.

In addition to the above, content processing mechanism 200 may be further configured to transmit carousels of modules. Such modules may include directory modules, application modules, and delta directory modules as described above. In one embodiment, the broadcast station transmits delta directories for a short period of time to indicate changes as described in the foregoing description. Generally speaking, at or near the time an updated main directory is transmitted by the broadcast station, transmission of the corresponding delta directories ceases. Further, mechanism 200 may be configured to convey both pushed and pulled data to receiving devices. Pulled data requests may be received via back channel 26, Internet 60, or otherwise. In various embodiment, the processing and transmission of data by broadcast station 16 may be performed hardware components, software components, or any suitable combination of hardware and software. For example, in one embodiment processing mechanism 200 may comprise a general purpose processor configured to execute program instructions designed to perform one or more of the embodiments described herein.

As noted above, the use of delta directories may serve to reduce the processing overhead in receiving devices. However, it is also noted that using delta directories may also simplify the task of producing updates on the broadcast side. For example, when a broadcaster (or other "sender") detects a change to a directory is required, the broadcaster may ordinarily be required to generate an entirely new main directory for transmission. As each main directory may be relatively large, and may also be "signed" with one or more keys which are not readily available, updating directory content in (or near) real time may be virtually impossible. In contrast, generating and conveying a delta directory may generally be accomplished in much less time that would be taken to generate and convey a new main directory.

While the above description describes a source of interactive content as being at a broadcast station 16, in an alternative embodiment database 230 and content processing mechanism 200 may reside at the location of a network communications operator 17. An example of such an alternative embodiment may be a cable station which inserts interactive content into a broadcast signal prior to transmission. Numerous such alternatives are possible and are contemplated.

Turning now to FIG. 13, one embodiment of a receiving device 1012 is shown. While FIG. 13 illustrates the client 1012 in the form of a set top box 1012, device 1012 may comprise other devices as well. Generally speaking, client 1012 is configured to receive a first signal 1070, such as a broadcast signal, and convey a second signal 1080, such as to a display or recording device. While client 1012 is shown coupled to an external mass storage device 1018, such storage may be internal to the client 1012 itself. Client 1012 includes a control unit 1030, front end 1026, return channel 1038, transport stage 1028, and AV stage 1034. Also represented in FIG. 13 is a memory 1090 which includes OS and/or middleware 1044, module manager 1036, and application(s) 1042. Also shown is are I/O interfaces 1040 and 1041, and conditional access (CA) module(s) 1032. I/O interface 1040 may be configured to detect user interaction via a remote control, keyboard, or other device. I/O interface 1041 may comprise circuitry such as an Ethernet or other network interface configured to provide bi-directional communication to the Internet, a home network, or otherwise. Control unit 1030 may comprise a microprocessor, memory (e.g., RAM), and other components which are necessary to perform ordinary general purpose computing. In one embodiment, applications 1042, OS/middleware 1044, module manager 1036, and CA module(s) 1032 comprise code which may be stored in a memory device of set-top box 1012. Additionally, CA module(s) 1032 may comprise system software configured to control access to particular programs or services which are accessible by set-top box 1012.

Generally speaking, client 1012 is operable to receive and decompress signals which may include digital data. The decompressed signals may be converted into analog signals such as PAL, SECAM, or NTSC format signals for television display, or may be in digital format for use by a device with a digital display. As shown in FIG. 13, device 1012 includes front end circuitry 1026 operable to receive audio, video, and other data from a received signal 1070. The received signal 1070 is fed into the client 1012 at the front end 1026, which may comprise an analog to digital (A/D) converter and tuner/demodulators (not shown). Front end 1026 may select and pass a particular frequency, demodulate it, and convert analog signals to a digital format. While analog data may be converted to digital data, as noted above a received signal may comprise digital data which may require no such conversion. The digitized output may then be conveyed to a transport stage 1028 which further processes the data, conveying a portion of the data to an audio-visual (AV) stage 1034 for display and another portion to control processor 1030. In addition, CA module 1032 may receive data from transport stage 1028 and may conditionally convey a descrambled or other signal to AV stage 1034. Signaling and control information may also be included in the broadcast along with the audio-video data and may be manipulated by software within the client 1012.

Module manager 1036 is generally configured to process received data as described in FIG. 5 or FIG. 11. While module manager 1036 is depicted as software stored within memory 1090, it is to be understood that part or all of the software associated with the module manager 1036 may be incorporated in OS/middleware 1044 or application 1042. In addition, the functionality described in FIG. 5 or FIG. 11 which may be performed by module manager 1036 may generally include functions performed partly in hardware as well. Those skilled in the art will appreciate that such functionality may be implemented in hardware and/or software as deemed appropriate.

Generally speaking, the module manager 1036 monitors the various module sources (1038, 1041, 1070) coupled to the set-top box. As described above, the module sources may include broadcast signals, HTTP signals, modem communications or other means for supplying input signals to the set-top box. (The term "module source" as used herein is broadly interpreted to include both transmission sources, such as satellite or modem transmissions, and inputs to the module management unit which carry processed, e.g., reconstructed and decompressed, signals.)

At start-up, the module manager 1036 idles while waiting for a packet at one of the module sources. The broadcast station may transmit modules for which the module manager 1036 is waiting on one of the module sources. The selection of a channel or module source to transmit a given module may be dependent upon the efficiency of the selected channel. For example, a module which is needed by many of the subscribing receivers might be transmitted over a broadcast channel, while a module which has a lower demand might be transmitted over a modem line. Because the module management unit monitors all of its module sources, a requested module may be received via any of the sources.

In one embodiment, the receiving device is initially configured to look for directory modules. If a packet header indicates the packet corresponds to a directory module, the packet may be retained and the remainder of the directory packets acquired. On the other hand, if a receiving device is currently looking for directory modules and a received packet does not correspond to a directory module, then the packet may be discarded. Once a module is completely loaded, the module management unit authenticates the module's producer certificate. The module management unit may be programmed to take any of several actions if the certificate is not authentic, such as simply discarding the module, warning the user, or shutting down the set-top box. If the certificate is authentic, the module may be checked to verify its integrity according to the security mechanisms implemented in the system. If it is determined that the module contains errors, it is discarded. If the module is error-free, it is made available to the system for use in downloading other modules and providing information about the modules for execution purposes. If a received module is a delta directory module, the corresponding directory module may be updated to reflect the changes indicated by the delta directory module. Alternatively, the delta directory module may be stored as described in the discussion above.

After start up, the module management unit may download modules in response to requests or as a result of being listed in the directory module (collectively, "needed" modules.) Requests for particular modules may be placed in a list of pending requests maintained by the module management unit. The module management unit waits, monitoring the module sources for packets corresponding to the needed modules. The packets are detected and separated from the incoming stream of packets in the manner described above for the directory module. The module management unit may retrieve packets of more than one module at a time if they are interspersed. When receipt of all the packets for a module is finished, the module is reconstructed. The module may be tested for errors and its authenticity may be verified if the appropriate error-checking and security mechanisms have been implemented. If the completed module corresponds to a pending request, the module is matched to that request (i.e., the request is canceled and the module is made available to the application or module which initiated the request.) When the module management unit completes downloading of the needed modules which were available at the module sources, it resumes waiting for the next needed module.

Audio-video signals and program control signals received by the client 1012 may include television programs, metadata, and menu selections accessible by a viewer through a user interface, as well as applications that may be executed. A viewer may control the client 1012 in a variety of ways, including through an infrared remote control unit, a control panel on the client, or a device that is used to choose from a menu displayed on the television screen. Selections and entries made by the viewer may be intended for one or more of several applications that are executing on the client. As mentioned above, broadcast signals 1070 are received via front end 1026 and are filtered by transport stage 1028. Unicast or multicast signals may generally be received via return channel 1038. Applications 1042 which execute on the client 1012 may arrive there in a variety of ways. For example, applications may be received via a broadcast signal 1070, via the return channel resource interface 1038, or via storage device 1018. Applications received via storage device 1018 may have been shipped originally with the client 1012 or may have been downloaded previously from another source and stored on storage 1018.

In one embodiment, client 1012 may be configured as a digital set top box for use with a satellite receiver or satellite integrated decoder/receiver that is capable of decoding MPEG video, audio, and data. For example, client 1012 may be configured to receive digital video channels that support broadband communications using Quadrature Amplitude Modulation (QAM), Quadrature Phase Shift Keying (QPSK), Coded Orthogonal Frequency Division Multiplexing (COFDM), or 8-vestigial side band (VSB), and to control channels for two-way signaling and messaging. The digital channels may carry compressed and encoded multiprogram MPEG (Motion Picture Expert Group) transport streams. Transport stage 1028 extracts the desired program from the transport stream and separates the audio, video, and data components, which are routed to devices that process the streams, such as one or more audio decoders, one or more video decoders, and optionally to RAM (or other form of memory) or a hard drive. It is to be understood that the client 1012 and storage device 1018 (as well as any data and signals from the broadcast service provider) may be configured to accommodate analog, digital, or both analog and digital data. For storage of received analog data, conversion to digital format may be performed.

Storage device 1018 is optionally coupled to the client 1012 and may be configured to store video, audio, executable code, metadata, and other data. Storage device 1018 may be internal to client 1012 or connected externally (e.g., through an IEEE 1394-1995 connection) with either a permanent connection or a removable connection. Further, storage device 1018 may comprise any suitable type of storage, such as a hard disk drive, a recordable DVD drive, magnetic tape, optical disk, magneto-optical disk, flash memory, or solid state memory. In addition, more than one storage device such as device 1018 may be attached to the client 1012. The client 1012 and/or storage device 1018 may further be incorporated into a television set. Executable data, such as program instructions, which is stored within storage device 1018 may be retrieved and executed. In one embodiment, retrieved data may be executed or otherwise utilized in synchronization with other applications or received signals, for example corresponding to a game show, commercial, or Internet based on-line game. Alternatively, retrieved data may be executed or utilized independently, such as for video-on-demand, banking, e-mail, a web browser, or an electronic program guide (EPG).

It is to be understood that the client 1012 and system 100 described herein are intended to be exemplary only. Broadcast network system 100 and client 1012 may be different than described herein without departing from the scope of the invention. Further, various components depicted in the client 1012 of FIG. 13 may be combined, such as the placement of the integration of storage device 1018 within client 1012. Numerous alternatives are possible and are contemplated.

As already mentioned, one or more components of the above described method and mechanism may comprise hardware and/or software. In those embodiments in which components comprise software, the program instructions which form the components may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

It is to be understood that the above embodiments are intended to be exemplary only. For example, the various features described herein may be combined in different ways than those explicitly discussed. In addition, the methods and mechanism discussed herein may be applied to other than interactive television systems. For example, other distributed processing, computing, telephone, information, and network systems may utilize the methods and mechanisms described herein. All such systems may generally be referred to as distributed computing systems. Numerous alternative configurations are possible and are contemplated.

What is claimed is:

1. A method for managing data in a distributed computing system having a processor, said method comprising:
   receive data comprising a first module which identifies a plurality of modules for use by an executable application, said first module comprising a main directory module which identifies modules for use by the executable application,
   receive additional data corresponding to said interactive television application, wherein said additional data identifies fewer than all of said plurality of modules and identifies an update to be made to one or more of said first module and said plurality of modules and wherein said additional data comprises a delta directory module which corresponds to said main directory module, said delta directory includes an identifier which indicates a version to which said main directory is updated in response to performing said update identified by said delta directory; and
   performing said update.

2. The method of claim 1, wherein said first module is pushed.

3. The method of claim 1, wherein said received main directory module is stored in a memory of a receiving device, and wherein said update comprises directly modifying said main directory module stored in memory.

4. The method of claim 1, wherein in response to performing said update, corresponding changes are effected in one or more of said plurality of modules, said corresponding changes being selected from the group consisting of: the addition of a new module; the removal of an existing module; and revisions to an existing module.

5. The method of claim 4, wherein said plurality of modules comprise one or more executable application codes or data for access by said application during execution.

6. The method of claim 1, wherein said executable application utilizing said additional data to register changes to said first module.

7. The method of claim 6, wherein said additional data is pulled by said application.

8. A receiving device comprising a memory and a processor, said device comprising:
  receive data by an interactive television application comprising a first module which identifies a plurality of modules and wherein said first module comprises a main directory module which identifies modules for use by the interactive television application;
  receive additional data corresponding to said interactive television application, wherein said additional data identifies fewer than all of said plurality of modules and identifies an update to be made to one or more of said first module and said plurality of modules and wherein said additional data comprises a delta directory module which corresponds to said main directory module, said delta directory includes an identifier which indicates a version to which said main directory is updated in response to performing said update identified by said delta directory; and
  a processing unit configured to update the version identified of said main directory module to reflect the changes indicated by the delta directory.

9. The method of claim 8, wherein said first module is pushed.

10. The receiving device of claim 8, wherein said processing unit is configured to update said directory module by directly modifying said main directory module.

11. The receiving device of claim 8, wherein in response to performing said update on the directory module, said processing unit is configured to effect corresponding changes to said plurality of modules, said changes being selected from the group consisting of:
  the addition of a new module; the removal of an existing module; and revisions to an existing module.

12. The receiving device of claim 8, wherein said plurality of modules comprise one or more of executable application codes or data for access by said application during execution.

13. The receiving device of claim 8, wherein said first module and said plurality of modules are pushed to said receiving device by a broadcaster, and wherein said additional data is pulled by said application from an alternate source.

14. The receiving device of claim 8, wherein said first module is pushed to said receiving device, and wherein said application is not permitted to directly access said first module and is configured to utilize said additional data to register changes to the first module.

15. A broadcast station comprising:
  a server coupled to a processor configured to convey data for use by an executable application;
  a transmitter configured to convey data for broadcast; and
  a processing mechanism configured to:
    generate a first module identifies a plurality of modules and wherein said first module comprises a main directory module which identifies modules for use by the interactive television application;
    convey said first module and said plurality of modules;
    determine a change to said plurality of modules is required;
    generate a second module which identifies fewer than all of said plurality of modules and which identifies said change; and wherein said second module comprises a delta directory module which corresponds to said main directory module, said delta directory includes an identifier which indicates a version to which said main directory is updated in response to performing said update identified by said delta directory; and
    convey said second module.

16. The broadcast station of claim 15, wherein said processing mechanism is further configured to: generate an updated main directory module which reflects said change; and
  convey said updated main directory subsequent to conveying said delta directory module.

17. The broadcast station of claim 15, wherein said processing mechanism comprises executable program instructions executed by a processor.

18. A computer accessible medium comprising computer executable instructions, said computer executable instructions when executed on a processing device cause the processing device to:
  receive data by an executable application comprising a first module which identifies a plurality of modules and wherein said first module comprises a main directory module which identifies modules for use by the executable application;
  receive additional data corresponding to said interactive television application, wherein said additional data identifies fewer than all of said plurality of modules and identifies an update to be made to one or more of said first module and said plurality of modules and wherein said additional data comprises a delta directory module which corresponds to said main directory module, said delta directory includes an identifier which indicates a version to which said main directory is updated in response to performing said update identified by said delta directory; and
  perform said update.

19. The computer accessible medium of claim 18, wherein the received main directory module is stored in a memory of a receiving device and said update comprises directly modifying said main directory module stored in memory.

20. The computer accessible medium of claim 19, wherein in response to performing said update, corresponding changes are effected in one or more of said plurality of modules, said corresponding changes being selected from the group consisting of: the addition of a new module; the removal of an existing module; and revisions to an existing module.

21. The computer accessible medium of claim 18, wherein said first module is pushed and wherein said application utilizes said additional data to register changes to the first module.

22. The computer accessible medium of claim 21, wherein said additional data is pulled by said application.

* * * * *

UNITED STATES PATENT AND TRADEMARK OFFICE
CERTIFICATE OF CORRECTION

| | | |
|---|---|---|
| PATENT NO. | : 7,523,145 B2 | Page 1 of 1 |
| APPLICATION NO. | : 10/829558 | |
| DATED | : April 21, 2009 | |
| INVENTOR(S) | : Willard et al. | |

It is certified that error appears in the above-identified patent and that said Letters Patent is hereby corrected as shown below:

In the Claims:

Claim 1, col. 22, line 45, please change "receive" to "receiving".

Signed and Sealed this

Fourteenth Day of July, 2009

JOHN DOLL
*Acting Director of the United States Patent and Trademark Office*